(12) United States Patent
Kendall

(10) Patent No.: US 10,932,422 B2
(45) Date of Patent: Mar. 2, 2021

(54) IRRIGATION DEVICE

(71) Applicant: John William Kendall, Westbank (CA)

(72) Inventor: John William Kendall, Westbank (CA)

( * ) Notice: Subject to any disclaimer, the term of this patent is extended or adjusted under 35 U.S.C. 154(b) by 384 days.

(21) Appl. No.: 15/415,824

(22) Filed: Jan. 25, 2017

(65) Prior Publication Data

US 2018/0206420 A1  Jul. 26, 2018

(51) Int. Cl.
*A01G 25/00* (2006.01)
*A01G 22/00* (2018.01)

(52) U.S. Cl.
CPC .............. *A01G 25/00* (2013.01); *A01G 22/00* (2018.02)

(58) Field of Classification Search
CPC .......... A01G 9/02; A01G 13/10; A01G 22/00; A01G 25/00; A01G 25/02; A01G 25/023; A01G 1/001

USPC ................... 47/48.5; 239/280, 275
See application file for complete search history.

(56) References Cited

U.S. PATENT DOCUMENTS

| 1,962,840 | A | * | 6/1934 | Rives | B05B 17/08 239/17 |
| 2,848,276 | A | * | 8/1958 | Clearman | B05B 3/008 239/280 |
| 4,416,420 | A | * | 11/1983 | Thompson | B05B 17/08 239/22 |
| 5,062,239 | A | * | 11/1991 | Helton | A01G 27/005 47/48.5 |
| 9,533,322 | B2 | * | 1/2017 | Atwool | B05B 15/70 |
| 2016/0309670 | A1 | * | 10/2016 | Chen | A01G 27/02 |

* cited by examiner

*Primary Examiner* — William V Gilbert

(57) ABSTRACT

An irrigation device, comprising: a base portion and a liquid dispersal portion. The liquid dispersal portion attached to the top center of the base portion configured with channels and spillways to funnel water to a plurality of plant growth zones spaced about the base portion periphery.

14 Claims, 19 Drawing Sheets

IRRIGATION DEVICE

CROSS-REFERENCE TO RELATED APPLICATIONS

This application claims the benefit of priority from New Zealand Utility Patent Application No. 719443 titled "An Irrigation Device" in New Zealand, 27 Apr. 2016 and Australian Utility Patent Application No. 2016204601 titled "An Irrigation Device" filed in Australia, 2 Jul. 2016.

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to an irrigation device. More particularly, the invention relates to an irrigation device, comprising: a base portion and a liquid dispersal portion. The liquid dispersal portion configured at the top center of the base portion. A nozzle portion attaches to the liquid dispersal portion, the nozzle portion configured to alter the direction of a flow of a liquid to plants growing in a plurality of plant growth zones spaced about the periphery of the base portion bottom edge. The support portion is substantially an truncated cone with an open top and bottom, the top wider than the bottom for stability in use.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that plants, are living multicellular organisms of the kingdom Plantae. They form a clade that includes the flowering plants, conifers and other gymnosperms, ferns, club mosses, hornworts, liverworts, and mosses.

Typically, plant growth is determined by environmental factors, such as temperature, available water, available light, carbon dioxide, and nutrients in a growth medium, such as soil. Any change in the availability of these external conditions will be reflected in the plant's growth. There are biotic factors that are also capable of affecting plant growth. Plants compete with other plants for space, water, light and nutrients.

Plant growth can also be affected by liquid and nutrient dispersed above and below the plant canopy. Many plants and in particular most varieties of vegetables grow better when water and nutrient are applied at ground level rather than from above as it is with most irrigation products on the market.

Unfortunately, when plants like vegetable plants for example, are watered from above, a multitude of problems can arise for both the plant and fruit growing on the plant.

Some of these problems may include anthracnose, blossom end rot, bacteria wilt, damping off, early blight, gray mold rot, soil rot, graywall and catfacing to name a few.

In many instances, standard irrigators spray plants indiscriminately; in an undefined pattern where plants receive an unequal share of liquid and nutrient. An unequal distribution can cause uneven plant growth, where one plant may grow faster than one beside it. The faster growing plant will have a tendency to block sunlight, inhibiting the growth of the smaller plant beside it.

Overwatered plants may grow slowly and may become susceptible to disease. Under watered plants may not mature and produce fruit. As a result, only a few plants may mature properly and bare fruit with indiscriminate or unequal watering.

Some vegetables require precise amounts of liquid and nutrient at specific times. A Squash plant prefers a large amount of water periodically dispersed under the leaves of the plant plants to grow and set sizable fruit, for example.

Irrigated water spread over the top of cucumber and pumpkin leaves encourage the spread of bacterial fungus such as white spot and cucumber mildew, for example.

The uncontrolled and improperly applied irrigation methods may attract unwanted insects and keep desirable pollinating insects away.

Typical spray irrigators may spray everything but the garden on a windy day, which wastes water.

Irrigation products that are not targeted to plants waste water, requiring a more frequent watering cycle and more water use. Growing plants in rows is outdated and an inefficient use of water.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 1A, 1B, 1C, 1D, and 1E illustrate various views of an exemplary base portion, wherein FIG. 1A illustrates a detailed perspective view of an exemplary base portion showing flat top with opening. FIG. 1B illustrates a detailed top view of an exemplary base portion showing channels and spillways, FIG. 1C illustrates a detailed bottom view an exemplary base portion showing arch end cover walls, FIG. 1D illustrates a detailed side view an exemplary base portion showing channel pipe and/or hose opening, and FIG. 1E illustrates detailed sectioned view of an exemplary base portion, in accordance with an embodiment of the present invention;

FIGS. 3A, 3B, 3C and 3D illustrate various views of an exemplary liquid dispersal portion, wherein FIG. 3A illustrates detailed perspective view of an exemplary dispersal portion showing upper part and lower part separated by a flange and a first fixed nut below the flange, FIG. 3B illustrates detailed perspective view of an exemplary dispersal portion illustrating rotating nut portion sowing flange and second fixed nut portion, FIG. 3C illustrates an exploded view of an exemplary liquid dispersal portion above rotating nut portion, and FIG. 3D illustrates an assembled view of an exemplary liquid dispersal portion joined with the rotating nut portion, in accordance with an embodiment of the present invention;

FIGS. 4A, 4B, 4C and 4D illustrate various views of an exemplary nozzle portion, wherein FIG. 4A illustrates a detailed perspective view of an exemplary nozzle portion showing cover top, FIG. 4B illustrates detailed side view of an exemplary nozzle portion showing outer casing with a plurality of ridges spaced about the sidewall outer surface, FIG. 4C illustrates a detailed perspective view of an exemplary nozzle portion showing connecting aperture, and FIG. 4D illustrates a detailed sectioned view of an exemplary nozzle portion showing outer casing, liquid dispersal chamber, inner casing with angled flange, liquid collection chamber, connecting aperture, and direction of a liquid flow, in accordance with an embodiment of the present invention, and;

FIGS. 5A, 5B, 5C, 5D, 5E and 5F illustrate various views of irrigation device assemblies, wherein FIG. 5A illustrates a detailed side view of an exemplary nozzle portion attached to an exemplary liquid dispersal portion with an exemplary rotating nut portion joined with an exemplary dispersal portion, FIG. 5B illustrates a perspective view of an exemplary base portion joined with an exemplary liquid dispersal portion attached to an exemplary nozzle portion, FIG. 5C illustrates a side-sectioned view of an exemplary base portion joined with an exemplary liquid dispersal portion joined with an exemplary nozzle portion with a hose attached to the liquid dispersal portion lower part, FIG. 5D shows a top view of an exemplary base portion showing plants growing in plants growth zones spaced about the periphery of the device, FIG. 5E shows a detailed side view of a plant support joined with an exemplary base portion, and FIG. 5F shows a detailed top view of exemplary concentric circles with exemplary plant openings within an exemplary flood irrigation trench configured about an exemplary irrigation device; in accordance with an embodiment of the present invention.

Figure 1A:
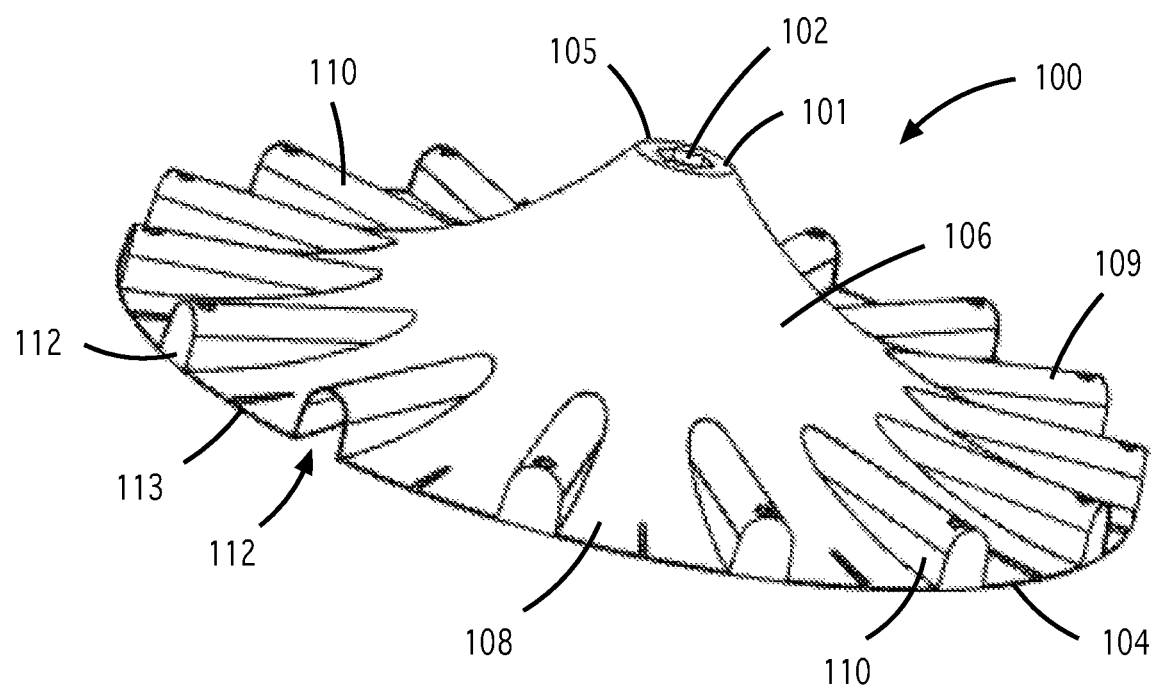

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "a method" or "the step" is a reference one or more methods or steps and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures.

The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated referencing this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features that are described in the context of separate embodiments may also be provided in combination in a single embodiment. Conversely, various features that are, for brevity, described in the context of a single embodiment, may also be provided separately or in any suitable subcombination. The Applicant hereby give notice that new Claims may be formulated to such features and/or combinations of such features during the prosecution of the present Application or of any further Application derived therefrom.

References to "one embodiment," " some embodiments," "another embodiment," "preferred embodiment," "an embodiment," "one embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in a preferred embodiment," or " in another embodiment," do not necessarily refer to the same embodiment, although they may.

Headings provided herein are for convenience and are not to be taken as limiting the disclosure in any way.

The enumerated listing of items does not imply that any or all of the items are mutually exclusive, unless expressly specified otherwise.

The terms "a", "an" and "the" mean "one or more", unless expressly specified otherwise.

Portions and/or sections that are in at least general communication with each other need not be in continuous communication with each other, unless expressly specified otherwise. In addition, portions and/or sections that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), method (s), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

The present invention will now be described in detail with reference to embodiments thereof as illustrated in the accompanying drawings.

In a preferred embodiment of the present invention, an irrigation device disperses liquid from an irrigation device to a plurality of plant growth zones within a plant growth area, which may be any geometric shape but is preferably circle shaped.

The irrigation device consists of a base portion and a liquid dispersal portion. The base portion may be any geometric shape but in a preferred embodiment is a truncated hollow cone with a flat top.

An aperture is configured at the top center of the base portion used for the insertion of an irrigation pipe or hose and is configured for the attachment of a liquid dispersal portion.

A nozzle portion is attached to the top of the liquid dispersal portion and the other end of the hose or pipe is connected to an external liquid supply. The base portion is then placed on top of earth and/or soil at ground level.

A flow of liquid is directed through the hose or pipe vertically through the liquid dispersal portion to the nozzle portion. The vertical flow of liquid is altered to flow horizontally within the nozzle portion, which is altered again to flow downward. The flow of liquid us altered yet again to flow at an angle 360° about the circumference of a nozzle portion sloped flange, which disperses the downward flow of liquid on top of, over and across the sloped surface of the base portion through a plurality of base portion channels to plants growing in the plant growth zones spaced about the base portion.

As liquid is dispersed from the nozzle portion, it flows through spillways between arch shaped channels. The channels are designed to collect and direct the flow of liquid equally to plant growth zones spaced about the periphery regardless of whether the base portion is resting level or not.

Liquid is dispersed downward rather than up, over where plants may be grown. Dispersing liquid in a downward direction in a 360-degree spray pattern is a more efficient way to disperse liquid to plants. Water is saved and the threat of waterborne disease minimized or eliminated all together because water is dispersed underneath the plant canopy to the top root of each plant growing in each plant growth zone around the base portion.

The nozzle portion may be any geometric shape or dimension.

Any portion may be manufactured from a variety of materials including, without limitation, plastics, metals, glass and/or carbon fiber.

Growing plants in a circle or concentric circles about the irrigation device or is a more efficient way to grow and water plants. Rows, patches or blocks of plants require much more space and require more water. Spillways spaced about the device sidewall govern the flow of liquid and nutrient to plant growth zones where a greater degree of sidewall slope increases liquid flow and the square area of a plant growth zone and a lesser degree of sidewall slope decreases liquid flow and the square area of the plant growth zone.

Rate of flow and flow duration also determine the size and shape of a plant growth zone and/or plant growth area.

In a preferred embodiment, one or more spillways direct a flow of water and nutrient to one or more plant growth zones with at least one plant growth zone inline and adjacent with at least one spillway. Plant growth zones are next to and/or overlapping one another and any plant growth zone may be any size and shape.

At least one organism grows in at least one plant growth zone and at least one organism comprises a seed and/or plant, and/or a leaf, and/or a stem, and/or a root.

Plants may be grown in any geometric shape or pattern about the device or any type of liquid dispersal apparatus.

In one embodiment, a plurality of plants are grown spaced a distance from one another on top of, inside or outside the circumference of at least one circle configured within the plant growth area. In a preferred embodiment, the plant growth area comprises a plurality of circles to grow plants, one circle inside the other, each circle spaced a distance from another creating concentric circles about the device, the plants spaced a distance from one another about the circumference of each circle and/or within each circle at least partially.

Any circle may be closed or open and the circumference of any circle undulated. An undulated circle configured at the outer edge of the plant growth area would provide additional space between plants. The space between plants also may provide access to plants growing in circles closer to the center of the plant growth area.

In yet another embodiment, a plurality of plants are grown in a spiral with plants spaced a distance from one another about the curve of the spiral. The space between the spiral curves can be dimensioned to allow for the growth of larger plants and access for harvesting plants such as vegetables, herbs and flowers.

A spiral is a curve, which emanates from a point, moving farther away as it revolves around the point. Plants can be planted outside, inside, on top of or between the curves of the spiral. Any spiral type may be configured within the plant growth area including an Archimedean spiral, a logarithmic spiral or a Cornu spiral to name a few.

Weed growth is a common problem for gardeners and farmers alike. Undesirable weed growth competes for nutrients at the expense of the more desirable plants often curtailing plant development, fruit size and production.

A non-translucent cover manufactured from plastic or cloth may be used to suppress weed growth. The plant growth area is covered with the cover, and is manufactured a dark color to attract heat from the sun. The cover may be permeable or non-permeable. Openings are cut into the cover to facilitate the insertion and planting of desirable plants. The openings may be configured in any geometric shape or pattern including a spiral, circle or plurality of circles.

In some embodiments, the growth area is covered with a translucent cover material manufactured from plastics and/or cloth. The cover material typically covers the cover and protects plants from insect, bird and small animal damage. The cover allows for the passage of heat, sunlight and liquid to the plants growing underneath and creates a greenhouse like growing environment. The cover material can be perforated or non-perforated. Creating this type of growing environment decreases the amount of time usually required for seed germination and increases plant growth.

In a preferred embodiment, at least one channel is configured without a cover wall so a hose and/or pipe may be inserted into the interior of the base portion. The hose and/or pipe has two ends with one end of the hose and/or pipe configured with a receptacle, which attaches to the liquid dispersal portion and the other end configured with a receptacle that attached to an external water supply.

In one embodiment, an elbow portion is connected to the liquid dispersal portion lower part, the elbow configured at an acute angle. A channel is configured through the center of the fitting for the pass through of liquid. The elbow has two ends; one end configured to attach to the liquid dispersal portion lower part and the other end configured to attach to a pipe, hose or fitting.

The pipe, hose or fitting end is preferably aligned with the channel arch that features the opening at the end for the insertion of a pipe or hose.

In one embodiment, a perimeter wall is configured at the bottom edge of the base portion, the perimeter wall top edge connected to the base portion bottom edge outermost edge. The perimeter wall may be vertical or sloped any direction and be any dimension.

The perimeter wall is designed to rest upon or at least partially insert into a growth medium contained within a plant container or earth and/or soil at ground level to at least partially prevent dislodgement or removal from wind blow.

In another embodiment, the lower bottom edge of the wall may be straight, curved or undulated. A curved or undulated bottom edge may make it easier to insert the base portion into a growth medium.

All plants and in particular, plants that grow best with flood type irrigation can be grown in a trench created about the periphery of the device. A plant growth area is created by first by levelling the soil. The plant growth area should be large enough to accommodate the spreading habit of the plants.

An area is created by tracing out two circles; one inside the other using two stakes and a string or cord. The stakes can be wooden, plastic or metal. And the sting is linear having two ends. Tying one end of the string or cord to the top of one stake and tying the other end of the sting or cord to the other stake will create a device that can be used to trace out the two circles in soil around the irrigation device.

Inserting the first stake into the ground at the center of the plant growth area and pulling the second stake away from the first stake until the string is taunt will set the radius of the first circle. Pulling the second stake around the first stake so the tip of the second stake inserts into the soil at least partially will trace the outline of the first circle. Keeping the string or cord taunt during the tracing process will form a uniform circle.

Changing the shorter string for a longer length of string and repeating the circle tracing steps will draw the outline of the lager second circle outside the smaller first circle.

A trench is created by forming an earthen mound or dam on top of the outline of each of the two circles by moving soil from outside and inside each circle. Common tools such as a shovel or rake can be used to move the soil. The two earthen mounds or dams form a trench between them that help hold water where plants are grown and irrigated.

The interior of the first circle is filled with soil to the height of the earthen mound or dam and levelled. The filled first circle provides a base to rest the irrigation device upon.

In one embodiment, a plurality of open ended arch shapes are spaced about the outermost earthen mound or dam, at least one opening configured within the arch shape, one or more plants planted in the opening(s).

Covering the entire plant growth area will help suppress weed growth. A portion of the weed barrier lies within the trench. Openings are cut out in a circle or concentric circles in the weed barrier within the trench, the openings spaced a distance from one another about the circumference of each circle. The openings are large enough for a plant and small enough to prevent excessive weed growth around each plant.

In some embodiments, any opening may be further configured with one or more cut slits any dimension spaced about the perimeter edge of the opening. The cut slits allow for the penetration of the bulb of the onion through and above the weed barrier cover.

The weed barrier can be held down in place over top of the plant growth area with any variety of weighted objects such as a brick, block or stone to prevent removal from wind blow. Metal or plastic pins commonly in use can be used as well.

A liquid dispersal portion is attached to the irrigation device base portion in preparation to water plants growing in the trench. One end of a hose is inserted through the opening provided in one of the base portion channels and connected to the lower part of the liquid dispersal portion. The other end of the hose is connected to an external water supply.

The irrigation device is then placed at the center of the plant growth area inside the first circle on top of the weed barrier. Seeds or plants are planted in the weed barrier openings within the trench. A spray nozzle may be attached to the liquid dispersal portion and utilized for delicate transplants or until the seeds germinate. The spray nozzle is replaced with the nozzle portion once the plants have strengthened and are able to withstand the flow of water that is dispersed periodically from the irrigation device to fill the trench between the earthen mounds or dams and flood irrigate the plants.

Plants grown in a spiral, circle or concentric circles are healthier and grow significantly faster than plants grown in rectangular patches or linear rows. Plants can be planted on top of, inside or outside the circumference of a spiral, one circle or a plurality of circles spaced a distance from one another. Plants growing spaced around each circle may be watered using any type of watering apparatus placed at the center of the inner most circle or anywhere within the plant growth area however, the irrigation device placed at the center of the inner most circle will benefit more plants and significantly save more water.

In another embodiment, the watering apparatus comprises a soaker or dripper hose, either hose laid about the curve of spiral or circumference of any circle.

A soaker hose that allows water to "seep" or "weep" very slowly. It allows water to seep into the soil very slowly instead of running off. A dripper hose is part of a drip irrigation system that saves water and fertilizer by allowing water to drip slowly to the roots of many different plants, either onto the soil surface or directly onto the root zone, through a network of valves, pipes, tubing, and emitters.

A watering device is located at the center of the first circle or spiral. In one embodiment, an underground pipe provides a vertical pipe riser with a receptacle attachment. A circular plant growth area around the vertical pipe is prepared, which may include tilling, fertilizing and levelling. A plastic or rubber weed barrier is laid out over the plant growth are on top of the soil and weighted or pinned to prevent removal from wind blow.

One end of a soaker hose or dripper hose is connected to the vertical pipe receptacle. The remaining length of hose is wound around the vertical pipe in a circle, concentric circles or a spiral formation on top of the weed barrier. The hose can sit freely or be fastened in place using clips pushed through the weed barrier and into the soil.

In one embodiment, a second watering apparatus is connected to the outer end of the soaker or dripper hose. In this way, water is supplied from both hose ends to plants growing directly underneath and/or adjacent to either hose. A watering apparatus attached to each end of a hose also provides for a more even distribution of water to plants growing along the hose. Plants growing near an outer end of a hose would receive water much quicker with a second watering apparatus connected to that end of the hose.

A circular shaped trench can also be created by using a template configured the shape of any one or both circles. Placing the template on top of said soil and then tracing an outline the circles by hand in the soil around the template creates the outline for the earthen mounds or dams with the trench there between. The template can also be covered with soil to the height of the earthen mound or the earthen dam. Preferably, a covered template would be biodegradable.

A mechanical device can also be used to create the circle tracings in soil.

Plants can grow extensive root systems in search of liquid and nutrient. Some plants such as oak trees or broccoli plants grow long tap roots to reach water that is deeper under ground, while some plants such as maple trees and pepper plants grow wider roots shaped like a ball, which also help give the plant stability. Root growth may be inhibited growing plants in a circle(s). A predictable and consistent supply of liquid from the center of the circle provides enough nutrients to inhibit root growth diminishing the length of a taproot or the width of a root ball.

A higher density of plants per square foot are grown about the device compared to other plant growing methods due to a more or less even distribution of water and nutrient, trench irrigation and spiral, circle or concentric circle planting patterns. This saves water and space, while being more productive.

In yet another embodiment, the base portion joins with a plant container comprising an outer wall, the plant container filled with a growth medium. The base portion may be any geometric shape but is preferably an inverted bowl shape configured having a wall encompassing the lower perimeter edge. The base portion inserts at least partially into the growth medium at the approximate top centre of the plant container. A space is created to grow plants between the base portion wall and the plant container outer wall. A depressed area is created within the space by moving growth medium from the center of the space up against the circumference of the base portion wall and circumference of the plant container outer wall. This creates a trench to flood irrigate plants, the trench comprised of two raised growth medium dams configured about the outer and inner circumference of the circle shaped space. The base portion may be with or without an aperture or without a liquid dispersal portion configured at the top centre. In some embodiments, the base portion may be configured with or without one or more channels or spillways, particularly if the base portion is configured a small size.

Water and nutrient have a tendency to drain from a plant container before plants can use them. This is often due to a space that forms between the outer wall of the plant container and the growth medium. The space is created when growth medium shrinks as it hardens. Water and nutrient dispersed to plants typically flow across the surface of the growth medium into the space, down the side and out of the plant container through drain holes. As a result, plants quickly become root bound.

Creating a depression within the growth medium is the first step to addressing this problem. A garden tool can be used to shape the depression on top of the growth medium and form a raised mound around the circumference of the depression to create a trench. The raised mound prevents water and nutrient from flowing into the space between the plant container outer wall at least partially inhibiting plants from becoming root bound.

The non-translucent cover facilitates the flow of water, which increases the potential width of the trench. The wider the trench, the more plants can be grown. The non-translucent cover also inhibits evaporation allowing the soil to hold moisture for longer periods of time. As a result, plants require irrigation less often, which saves water.

A non-translucent cover of color reflects light to induce more flowering and blossom set. A cable comprising a plurality of lights may be laid under one or more circles of plants to induce flowering, fruit set or to add night time decoration.

The plant growth area with or without the non-translucent cover may be covered with a cover material. The cover material disposed to protect the plants from damage caused by insects, birds and small animals. The cover material may be non-perforated or perforated but is preferably perforated to allow for the penetration of liquid dispersed from above. The cover material is translucent to allow for the passage of sunlight to aid in plant seed germination. The cover material is further disposed to collect heat from the sun and may be fabricated from a variety of materials including plastics and cloth.

Figure 1B:
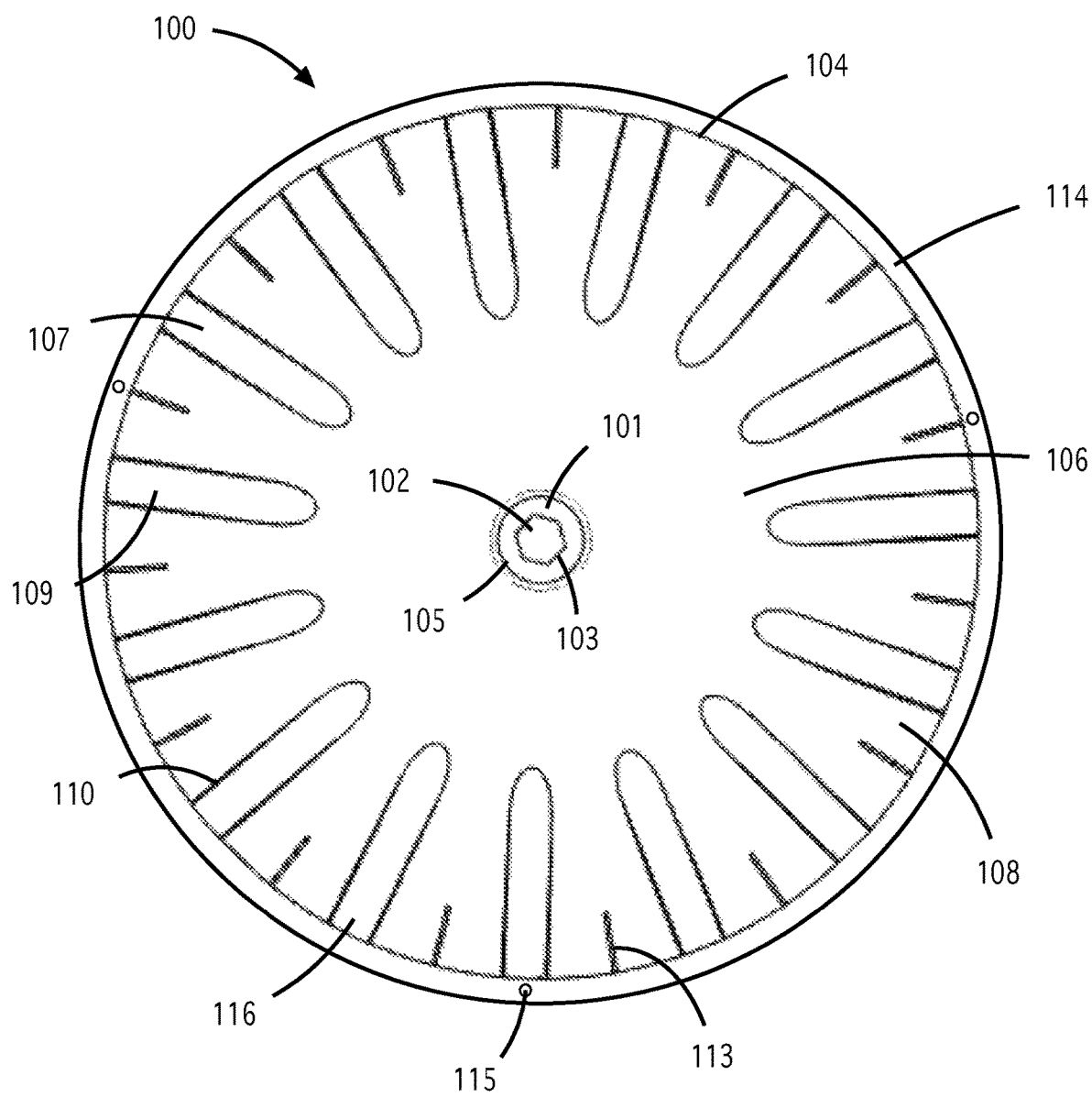
Figure 1C:
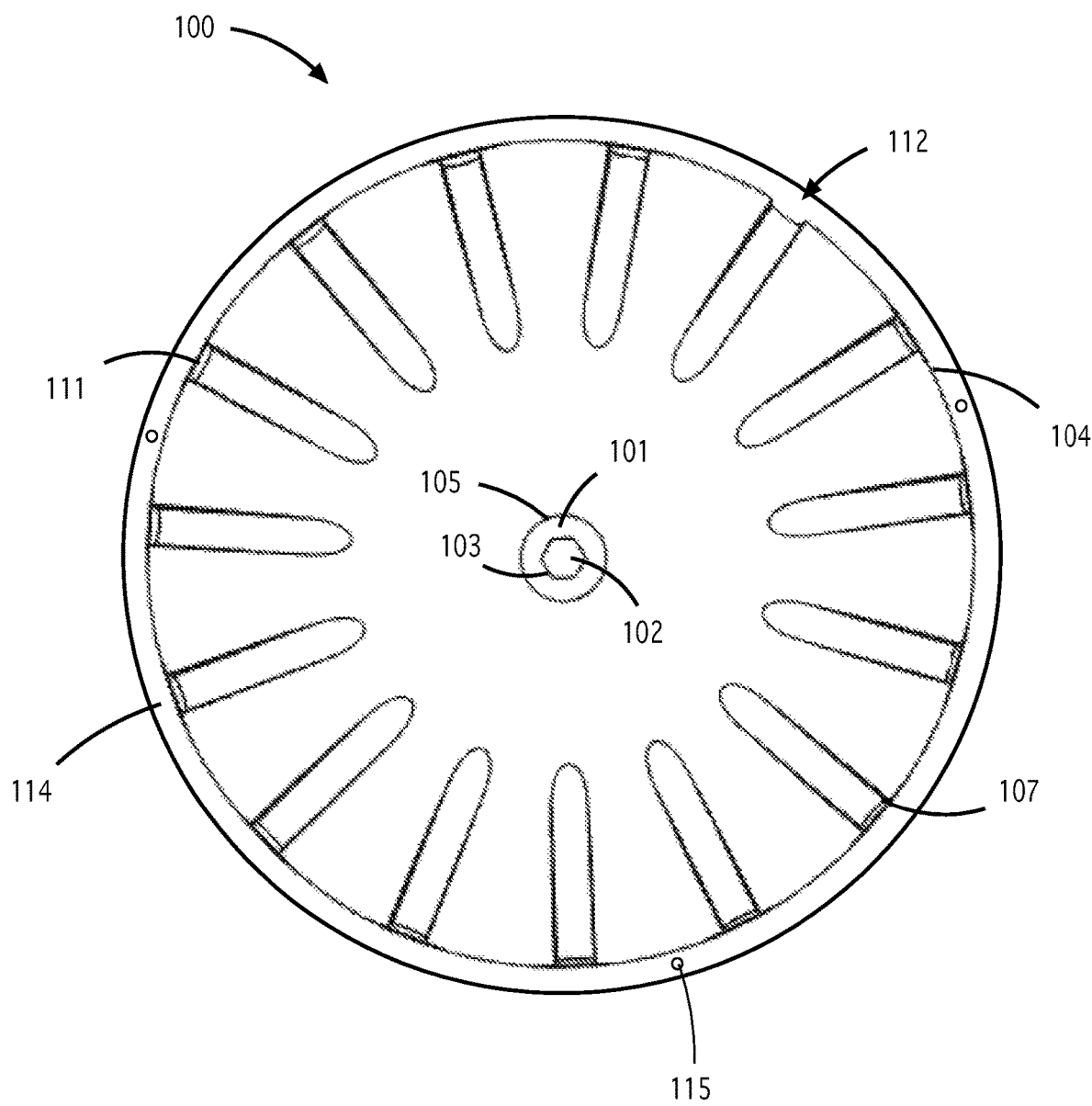
Figure 1D:
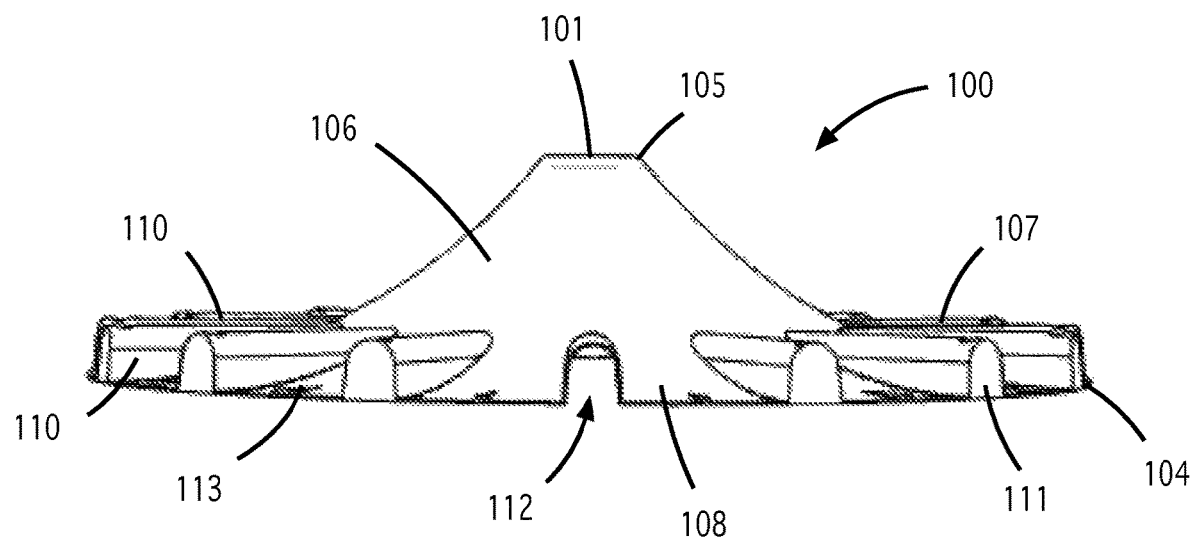
Figure 1E:
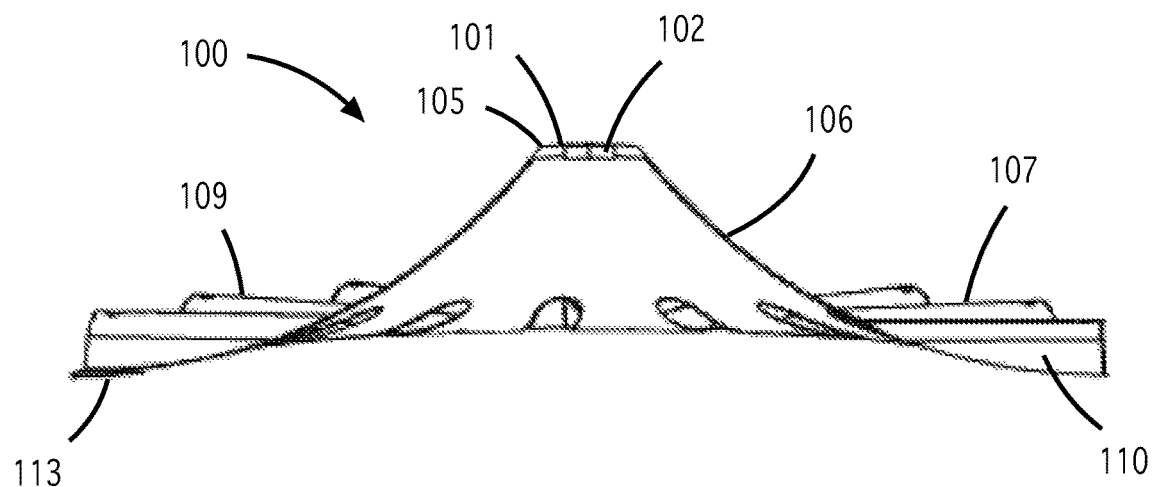

FIGS. 1A, 1B, 1C, 1D and 1E illustrate various views of an exemplary base portion 100, wherein FIG. 1A illustrates a detailed perspective view of an exemplary base portion showing flat top with opening. FIG. 1B illustrates a detailed top view of an exemplary base portion showing channels and spillways, FIG. 1C illustrates a detailed bottom view an exemplary base portion showing arch end cover walls, FIG. 1D illustrates a detailed side view an exemplary base portion showing channel pipe and/or hose opening, and FIG. 1E illustrates detailed sectioned view of an exemplary base portion, in accordance with an embodiment of the present invention.

The base portion 100 is substantially a truncated hollow cone with a flat top 101, the flat top 101 planar with an aperture 102 at the center.

The aperture 102 comprising three or more sidewalls 103, the aperture 102 may be any shape or size. The aperture 102 is used for the insertion of an irrigation pipe or hose and is configured for the attachment of a liquid dispersal portion 300.

A bottom edge 104 is configured at the lower perimeter of the base portion 100 and a top edge 105 is configured at the outer perimeter of the flat top 101 with a sloped surface 106 between the bottom edge 104 and the top edge 105.

A curved or sloped surface 106 facilitates a flow of water.

A spillway 108 is configured between two channels 107.

Each channel 107 is configured an arch shape 109 but may be any shape or profile. The channel is closed at the top and open at the bottom comprising at least one sidewall. A vertical or sloped cover wall 111 is configured at one end of the channel.

At least two channels 107 and one spillway 108 is configured at any point between the base portion bottom edge 104 and the flat top outer edge 105 the two channels designed to direct a flow of liquid into at least one spillway 108.

At least one spillway 108 directs a flow of water and nutrient a plant growth zone 200, one plant growth zone 200 adjacent and inline with at least one spillway 108.

A plurality of plant growth zones 200 are configured about the periphery of the base portion 100 and may be of any size and shape, one plant growth zone 200 next to another plant growth zone 200. One plant growth zone 200 may overlap another plant growth zone 200 in use.

At least one channel 107 may be configured without a cover wall 111 so a hose 501 and/or pipe may be inserted through an opening 112 at one arch end into the interior of the base portion 100. One end of the hose and/or pipe is configured with a receptacle disposed to attach to a liquid dispersal portion 300 and the other end of the hose and/or pipe configured with a receptacle that attaches to an external water supply.

A planar flange 114 encompasses the bottom edge 104 of the base portion 100. One or more openings 115 are spaced about the flange for the insertion of fasteners such as a nail or spike. The base portion is placed on top of the ground and a fastener is inserted through the opening into the ground to secure the base portion in place.

In some embodiments, a ledge 116 in configured on top of at each arch end above the cover wall. The indentation provides structural strength for the end of each arch and provides a surface in which to support a variety of plant supports 503 including plant trellises.

A stub wall 113 may be configured anywhere within a spillway 108. The sub wall 113 is to provide separation when one base portion 1 is inserted into another for economical shipping.

A liquid dispersal portion 300 is configured at the top center of the base portion 100 to disperse water to 406 growing in plant growth zones around the periphery of the device.

A support portion may join with the base portion to support plants; part of the support portion rests upon the flange thereby holding the base portion in place upon the ground.

Figure 2A:
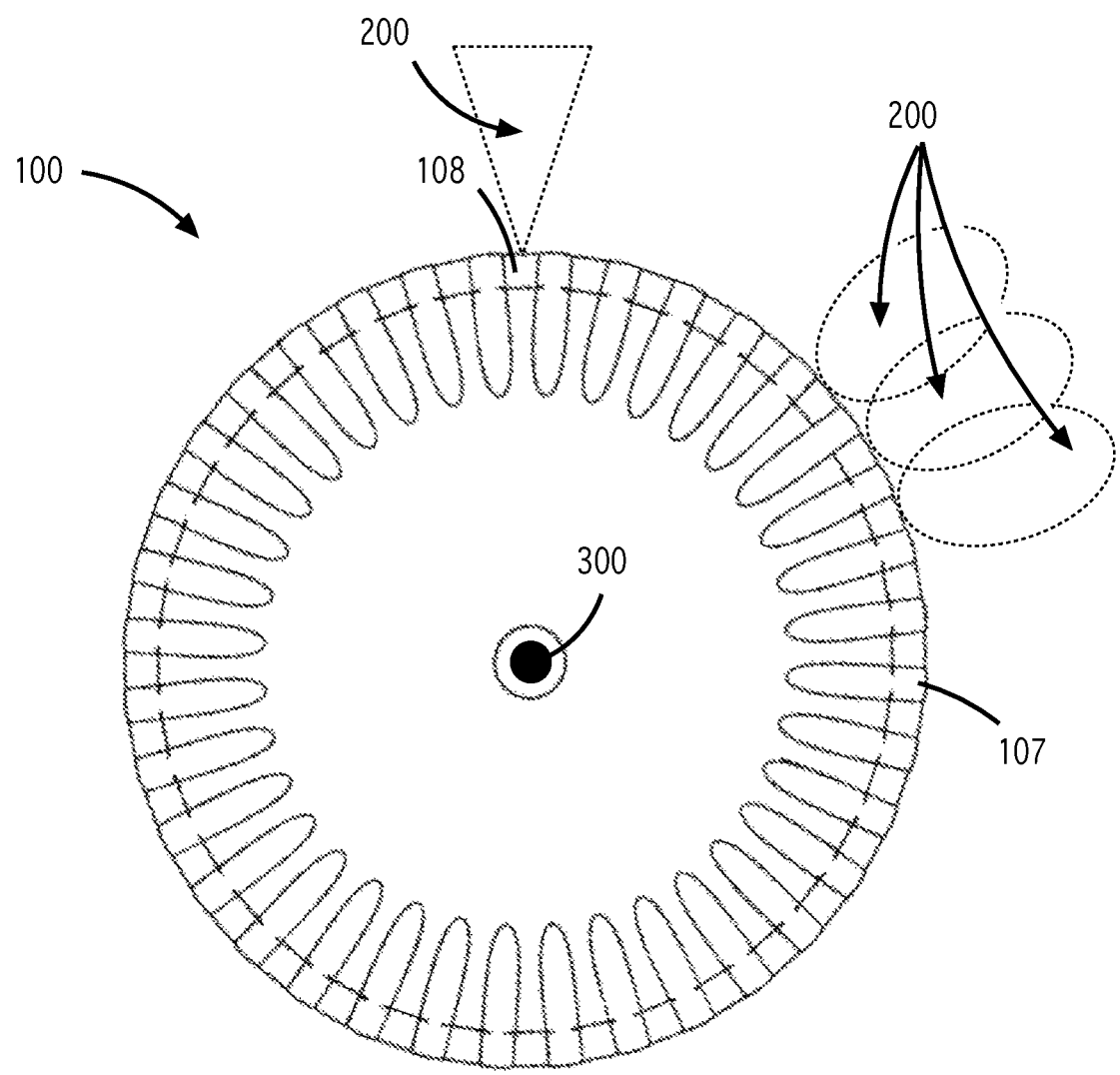
FIG. 2A illustrates a detailed top view of an exemplary base portion showing a plant growth zone, in accordance with an embodiment of the present invention.

FIG. 2A illustrates a detailed top view of an exemplary base portion showing a plant growth zone 200, in accordance with an embodiment of the present invention.

Figure 3A:
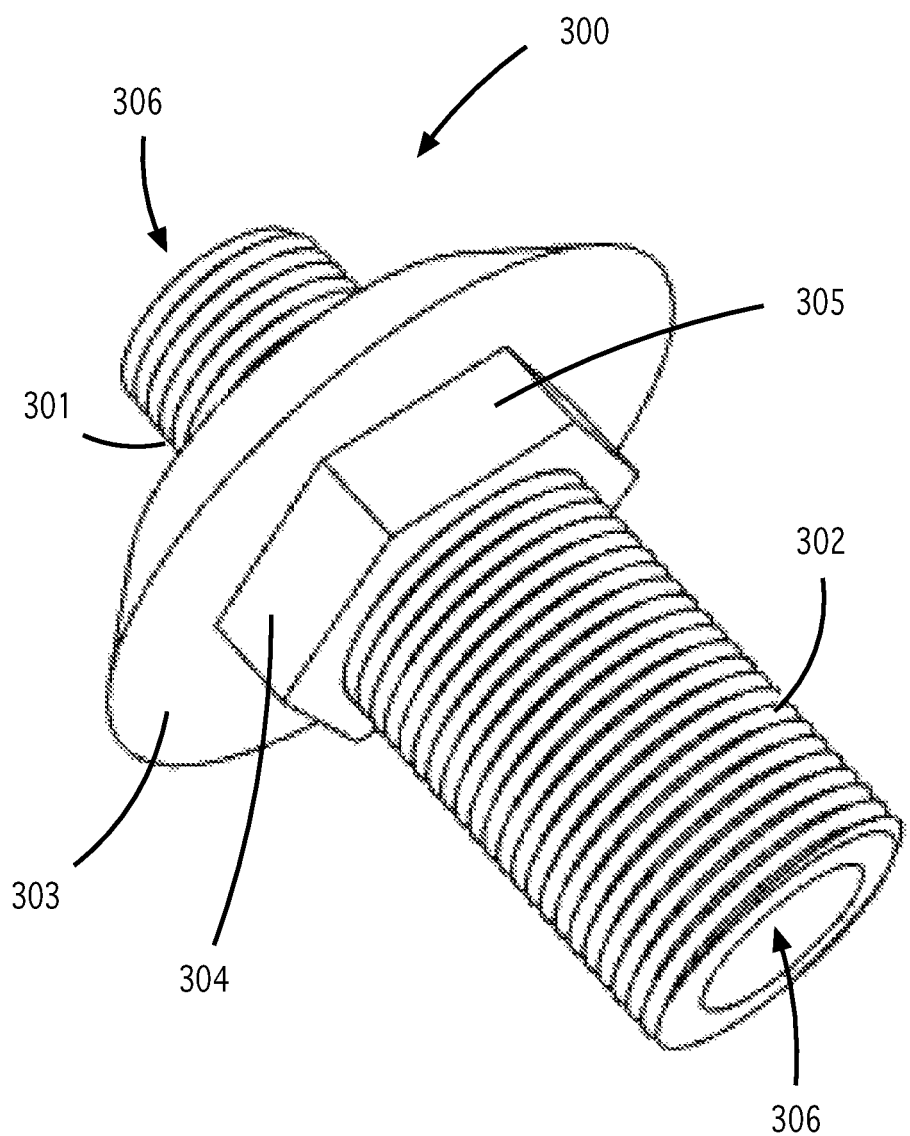
Figure 3B:
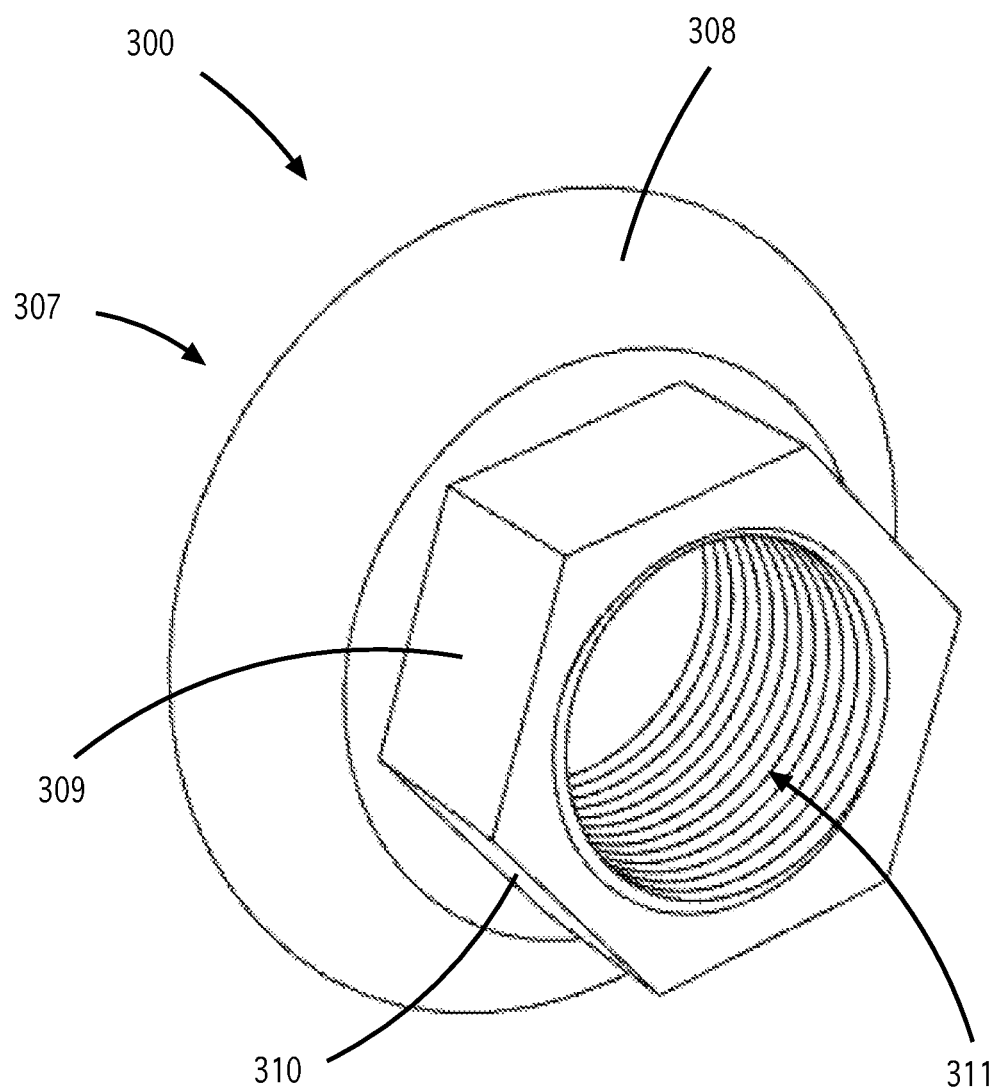
Figure 3C:
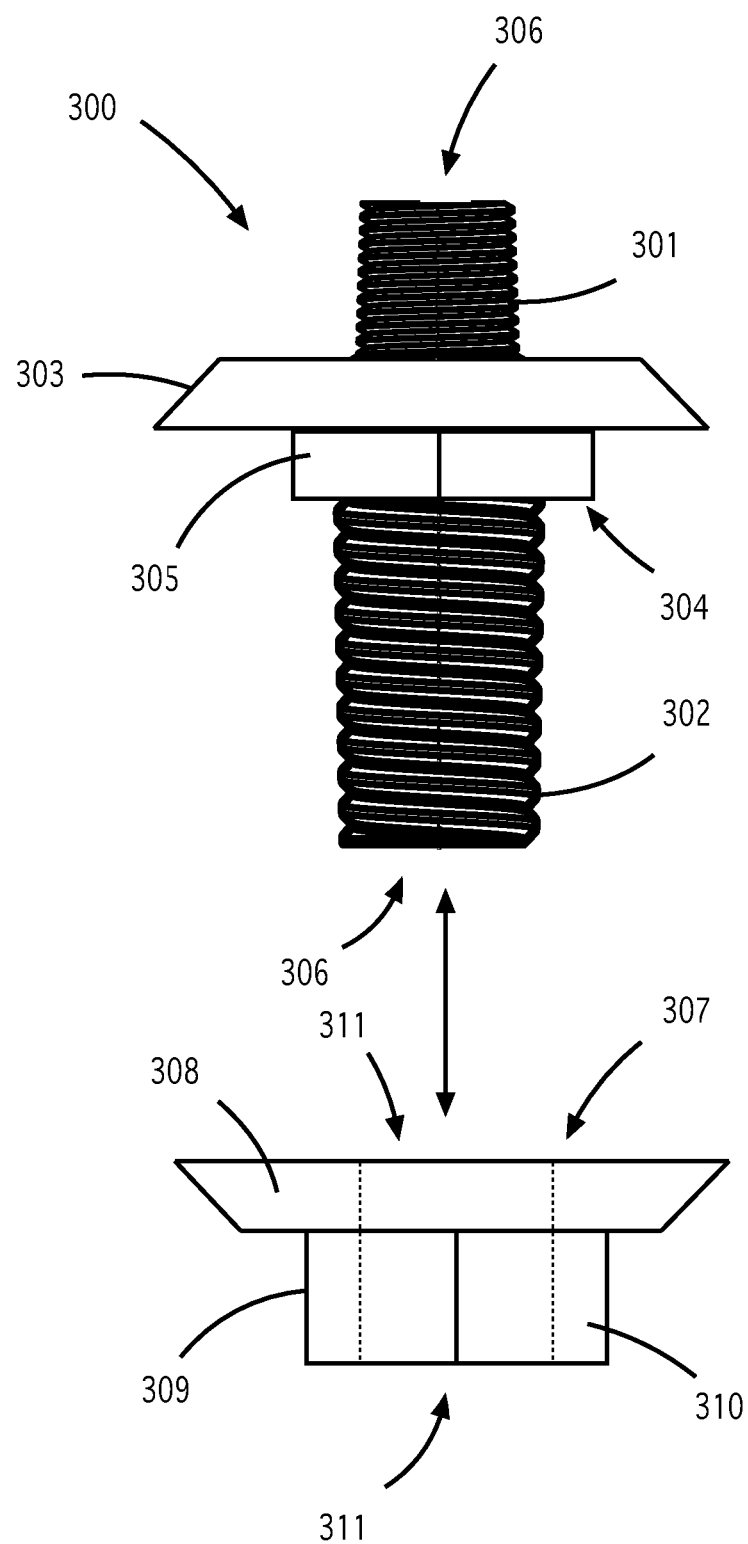
Figure 3D:
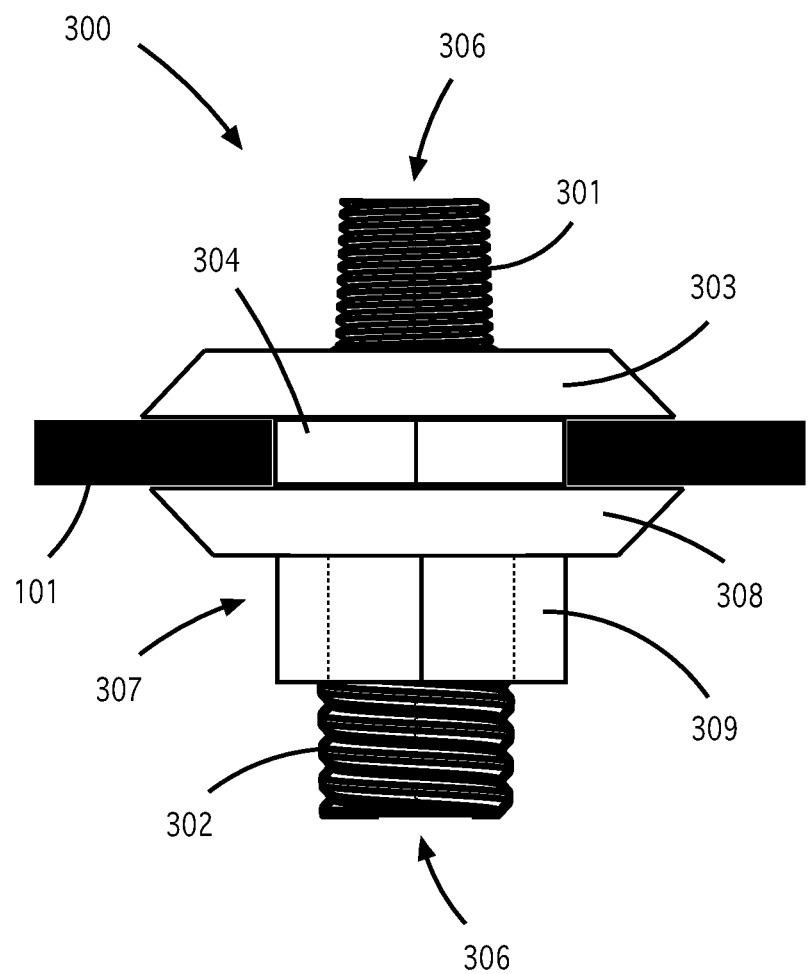

FIGS. 3A, 3B, 3C and 3D illustrate various views of an exemplary liquid dispersal portion 300, wherein FIG. 3A illustrates detailed perspective view of an exemplary dispersal portion showing upper part and lower part separated by a flange and a first fixed nut below the flange, FIG. 3B illustrates detailed perspective view of an exemplary dispersal portion illustrating rotating nut portion sowing flange and second fixed nut portion, FIG. 3C illustrates an exploded view of an exemplary liquid dispersal portion above rotating nut portion, and FIG. 3D illustrates an assembled view of an exemplary liquid dispersal portion joined with the rotating nut portion, in accordance with an embodiment of the present invention.

In a preferred embodiment of the present invention, the liquid dispersal portion 300 comprises an upper part 301 and a lower part 302.

A flange portion 303 and a first fixed nut portion 304 are configured between the upper part 301 and lower part 302. The flange portion 303 encompasses the liquid dispersal portion 300 above the first fixed nut portion 304. The flange portion 303 is a larger dimension than the first fixed nut portion 304 so it will rest upon the base portion 100 flat top 101. The flange portion 303 is preferably circle shaped but can be any shape or profile. The upper part, lower part, flange portion and first fixed nut portion are one piece and unitary.

The upper part 301 is configured to attach to a nozzle to disperse water in various ways including trickle, drip, spray and bubble. The lower part 302 is configured to attach to a hose 501 or pipe, which delivers water 406 from an external source.

The interior of the liquid dispersal portion 300 is configured with a channel 306 throughout open from top to bottom. The channel 306 may be any shape or size and is configured to pass through liquid and nutrient dispersed from the hose or pipe to the nozzle.

The first fixed nut portion 304 is configured with three or more sidewalls 305 any shape or size.

The first fixed nut portion 304 is configured to insert into the flat top 101 opening 102 with at least one first fixed nut portion 304 sidewall 305 adjacent to a flat top 101 opening 102 sidewall 103 of corresponding size and shape. The alignment of at least one first fixed nut portion 304 sidewall 305 next to at least one corresponding flat top 101 opening 102 sidewall 103 is disposed to inhibit the rotation of the liquid dispersal portion 300 in use.

The flange portion 303 is configured on top of the first fixed nut portion 304. The flange portion 303 is a larger dimension than the first fixed nut portion 304 and any shape or profile.

A rotating nut portion 307 attaches the liquid dispersal portion 300 to the base portion 100. The rotating nut portion 307 is one piece and unitary comprising a flange 308 configured on top of a second fixed nut portion 309. The interior of the rotating nut portion is configured with a channel 311 throughout open from top to bottom. The channel 311 may be any shape or size and is configured to attach to the lower part of the liquid dispersal portion 300.

The second fixed nut portion 309 of the rotating nut portion 307 is configured with three or more sidewalls 310 any shape or size.

The flange portion 308 is configured at the top of the second fixed nut portion 309 and a larger dimension than the second fixed nut portion 309. The flange portion 308 may be any shape or profile.

The upper part 301 inserts into the flat top 101 opening 102 of the base portion 100 so the first fixed flange portion 303 rests upon the flat top 101 and the first fixed nut portion 304 is inside the flat top 101 opening 102 and the first fixed nut portion 304 sidewalls 305 are next to the flat top 101 opening 102 sidewalls 103.

The rotating nut portion 307 attaches and joins with the liquid dispersal portion 300 lower part 302. The rotating nut portion 307 is rotated upward until the top of the rotating nut 307 flange 308 rests against the underside of the flat top 101. The union of the two secures the liquid dispersal portion 300 to the base portion 100.

Figure 4A:
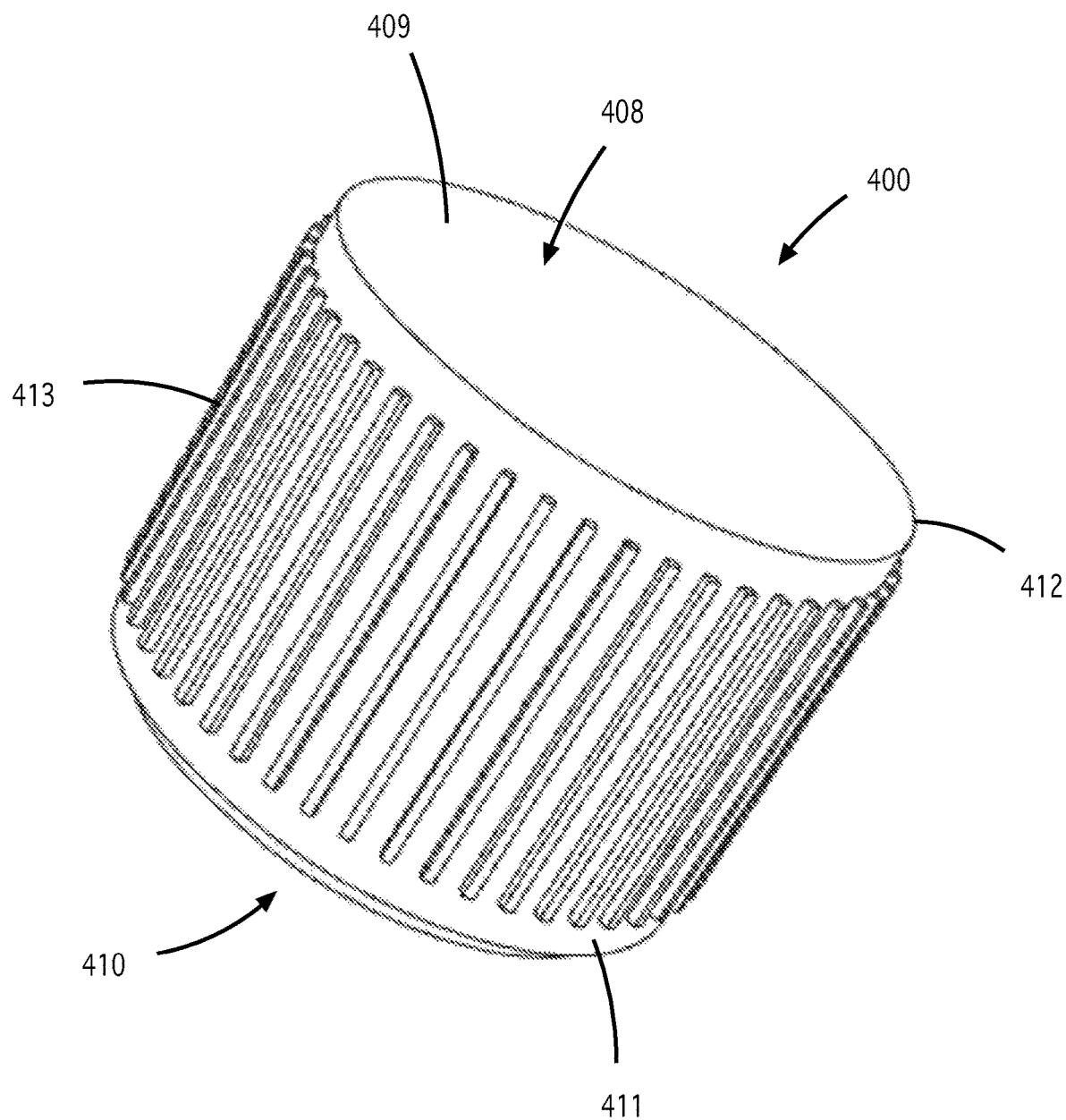
Figure 4B:
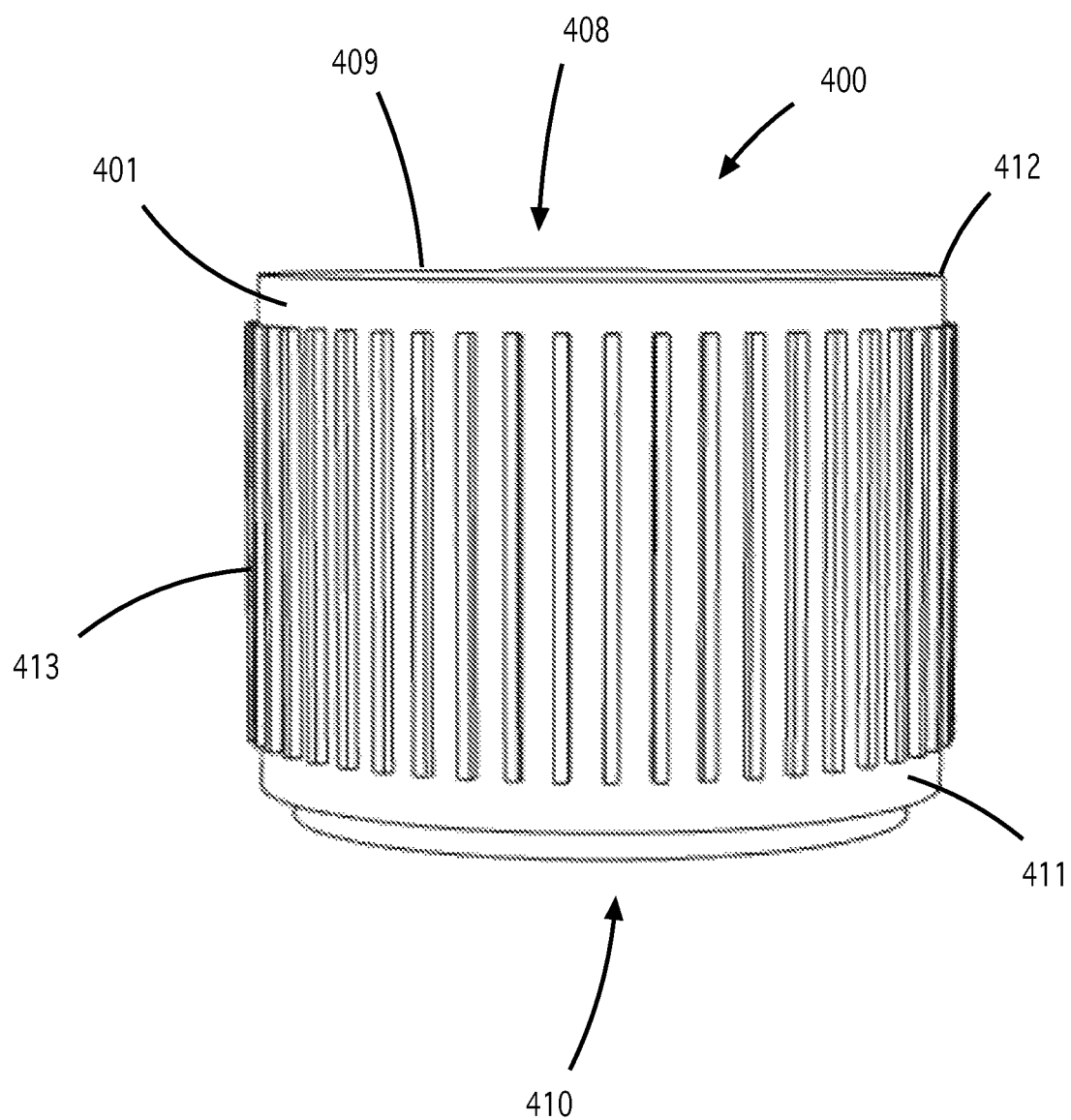
Figure 4C:
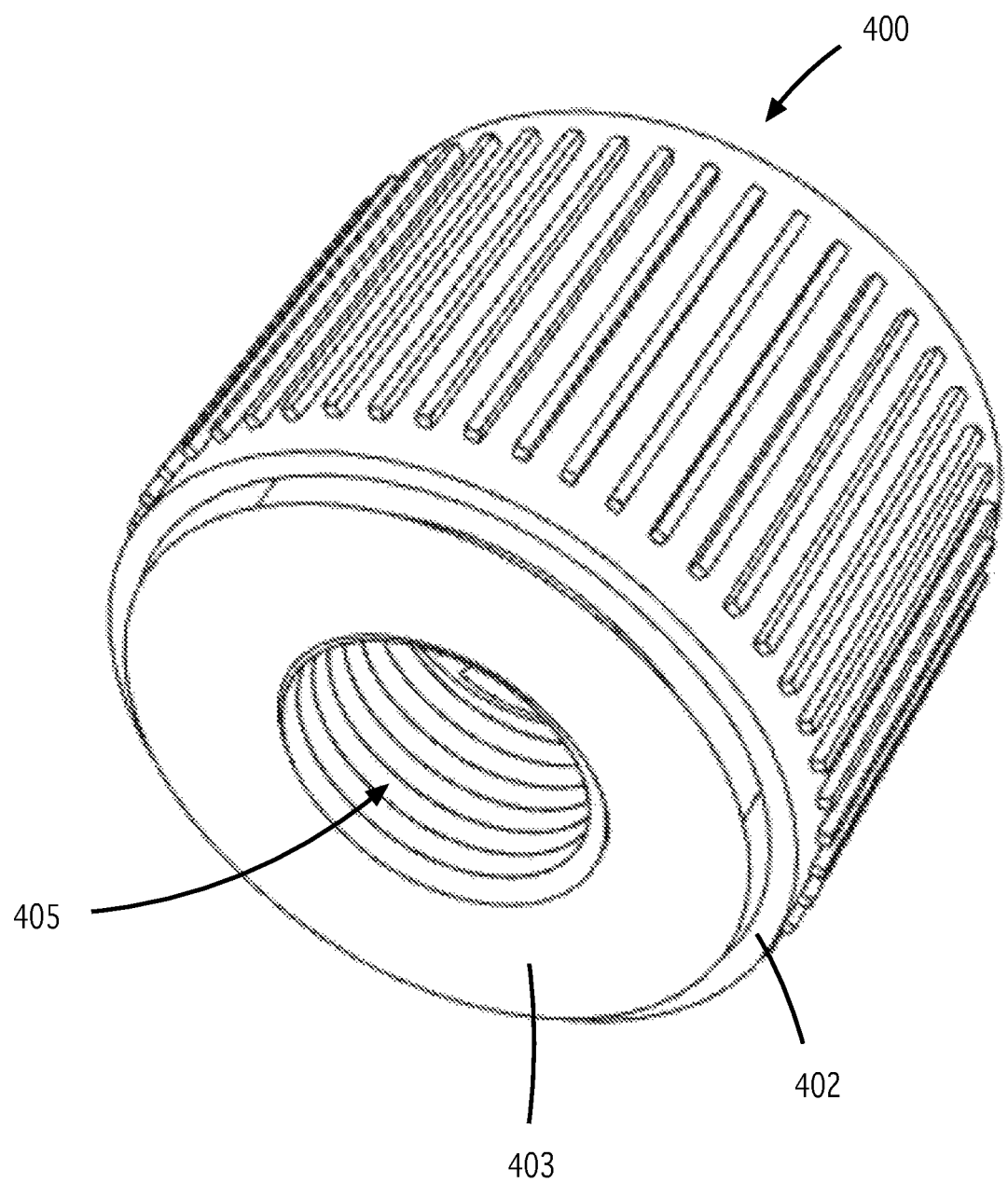
Figure 4D:
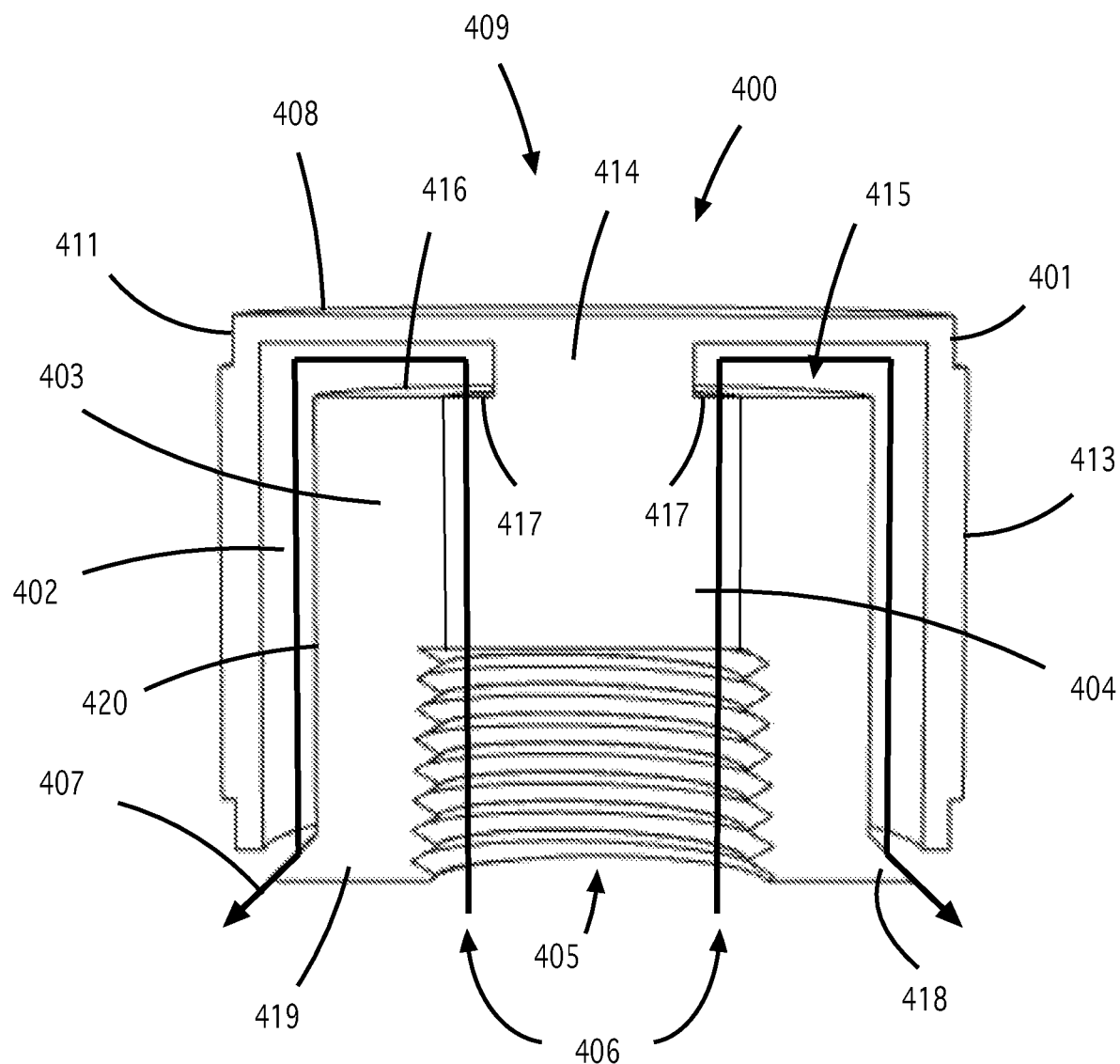

FIGS. 4A, 4B, 4C and 4D illustrate various views of an exemplary nozzle portion 400, wherein FIG. 4A illustrates a detailed perspective view of an exemplary nozzle portion showing cover top, FIG. 4B illustrates detailed side view of an exemplary nozzle portion showing outer casing with a plurality of ridges spaced about the sidewall outer surface, FIG. 4C illustrates a detailed perspective view of an exemplary nozzle portion showing connecting aperture, and FIG. 4D illustrates a detailed sectioned view of an exemplary nozzle portion showing outer casing, liquid dispersal chamber, inner casing with angled flange, liquid collection chamber, connecting aperture, and direction of a liquid flow, in accordance with an embodiment of the present invention.

The nozzle portion 400 is disposed to attach to and join with a liquid dispersal device, the liquid dispersal device any type threaded or unthreaded end of pipe, fitting or hose but preferably attaches to a liquid dispersal portion 300.

The nozzle portion 400 comprises an outer casing 401, a liquid dispersal chamber 402, an inner casing 403, a liquid collection chamber 404 and a connecting aperture 405.

The nozzle portion 400 is configured to disperse liquid 406 on top of, over and across the base portion 100 to plants growing in a plurality of plant growth zones 200 spaced about the periphery of the base portion 100. The nozzle portion 400 alters the directional flow 407 of the liquid 406 as illustrated in FIG. 4D.

The outer casing 401 is substantially a cover 408, the cover 408 any geometric shape or dimension but is preferably a closed circle shape with a closed cover top 409 and open bottom 410. The cover top 409 is substantially planar.

A sidewall 411 encompasses the cover top 409 outer edge 412 to form an enclosure. The sidewall 411 may be vertical or sloped any direction. The cover top 409 encloses the inner casing 403 creating a space between them the liquid dispersal chamber 402.

In a preferred embodiment, a plurality of ridges 413 are spaced about the sidewall 411 outer surface, the ridges 413 vertical, angled or sloped extending out beyond the sidewall 411 outer surface. The ridges 413 provide a textured surface to at least partially prevent slippage when turned mechanically by a tool or manually by hand.

The inner casing 403 comprises a spacer 414, a ledge 416, the liquid collection chamber 404, a sloped flange 418 and the connecting aperture 405. The spacer 414 is configured at the top center of the inner casing 403 under the cover top 409 forming a space 415 there between. The spacer 414 is dimensionally smaller than the inner casing 403 forming the ledge 416. The ledge 416 may be sloped or planar. A plurality of openings 417 spaced about the ledge 416, the openings 417 through the ledge 416 to the liquid collection chamber 404 contained within the inner casing 403.

The liquid collection chamber 404 is configured between the spacer 414 and the connecting aperture 405 and may be any geometric shape or dimension. The connecting aperture 405 may be threaded or non-threaded and is configured to attach to the liquid dispersal portion 300, common irrigation fitting, pipe or hose.

A sloped flange 418 encompasses the inner casing 403 lowermost perimeter edge 419. The sloped flange 418 may be any degree of angle sloped down and away from the inner casing wall 420. The sloped flange 418 is disposed to disperse liquid 406 at said flange angle.

The liquid collection chamber 404 is disposed to channel liquid 406 through the ledge 416 openings 417 into the liquid dispersal chamber 402.

The distance of the space between the outer casing and the inner casing also governs the flow of a liquid. The greater the space the more flow; the smaller the space the less flow of a liquid.

As illustrated in FIG. 4D, a flow of liquid 406 rises vertically within the liquid collection chamber 404 through ledge 416 openings 417 into the liquid dispersal chamber 402. The flow direction of the liquid is changed from vertical to horizontal as the liquid comes into contact with the top interior of the outer casing 401. The flow direction of the liquid is changed again from a horizontal flow to a downward flow when it contacts the interior surface of the outer casing 401 sidewall 411. The downward flow is altered again by the sloped flange 418, the liquid 406 cascading at an angle over the sloped flange 360 degrees about the circumference of the sloped flange 418.

Figure 5A:
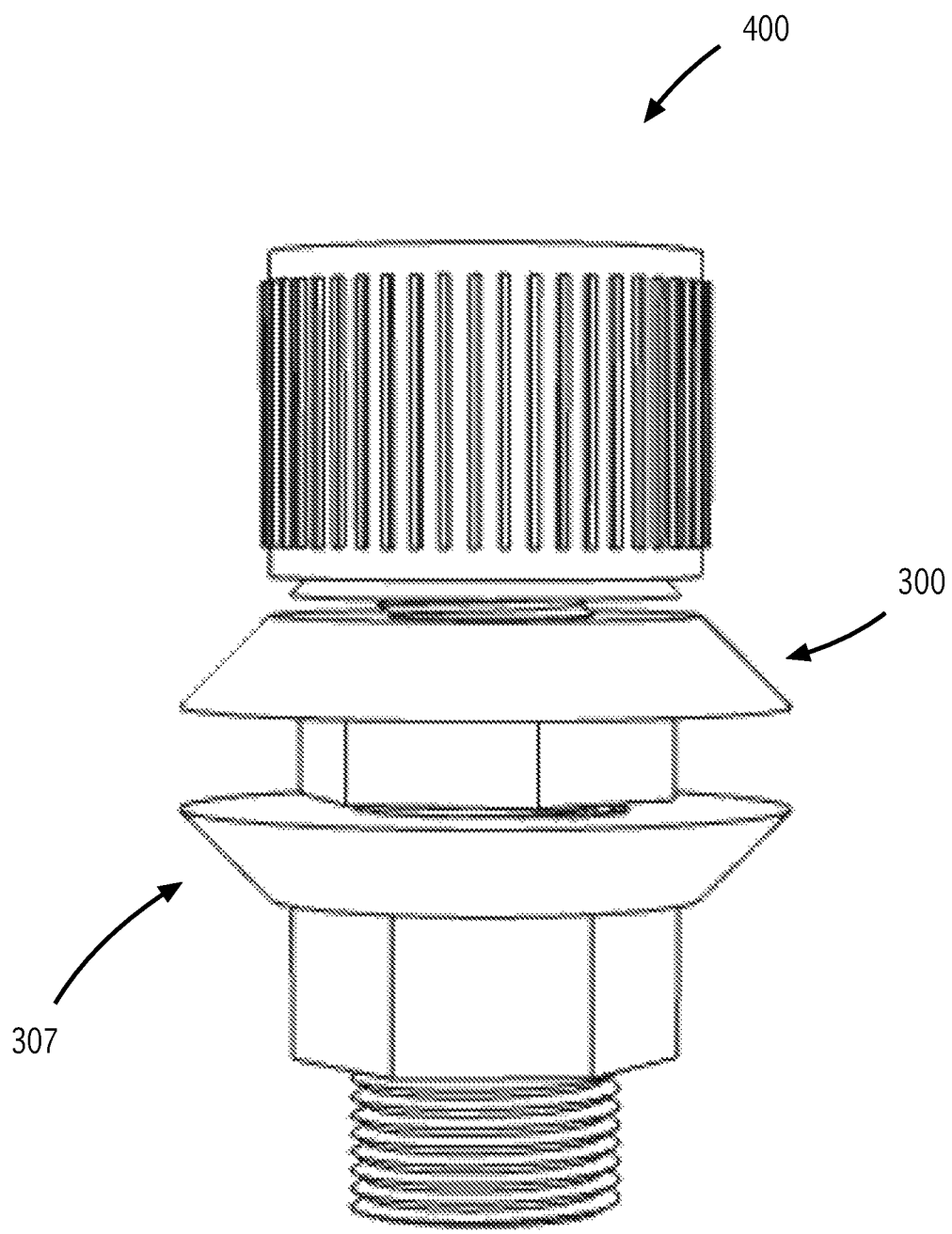
Figure 5B:
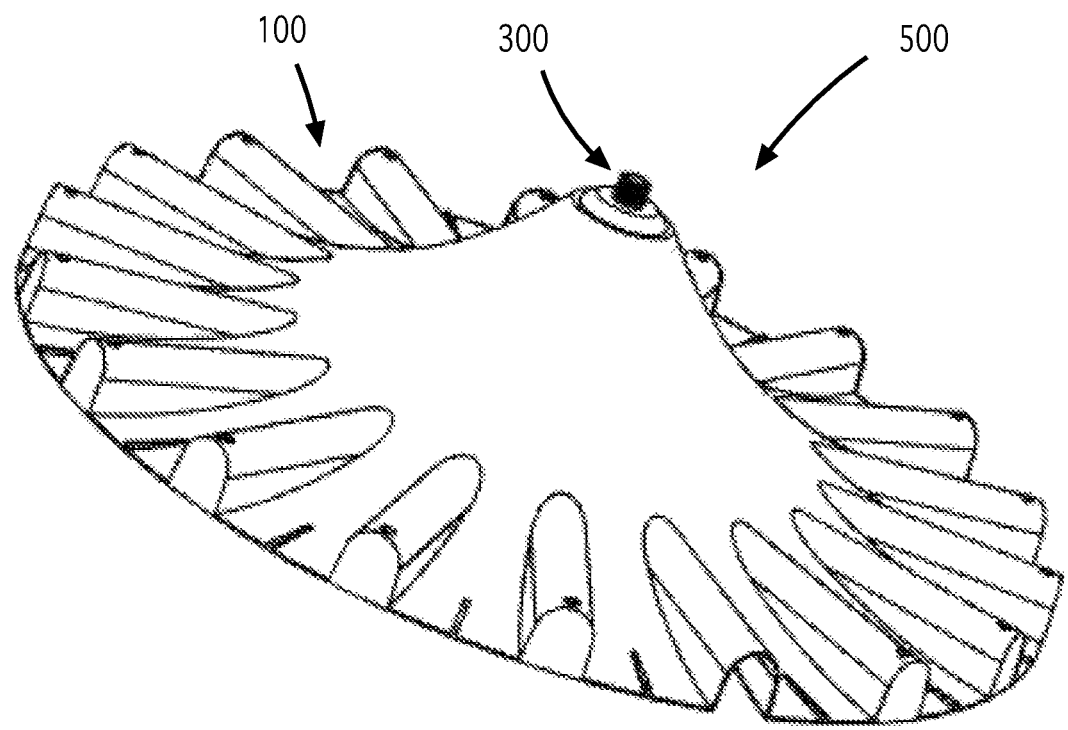
Figure 5C:
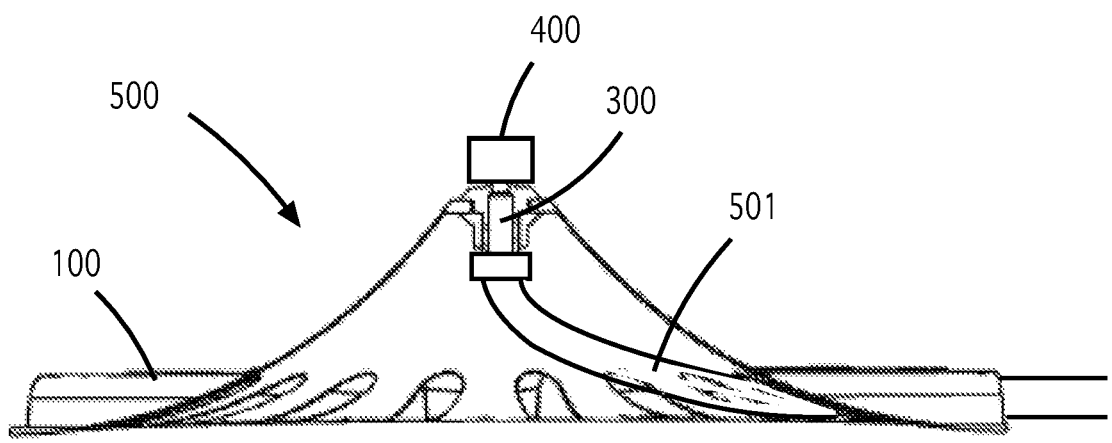
Figure 5D:
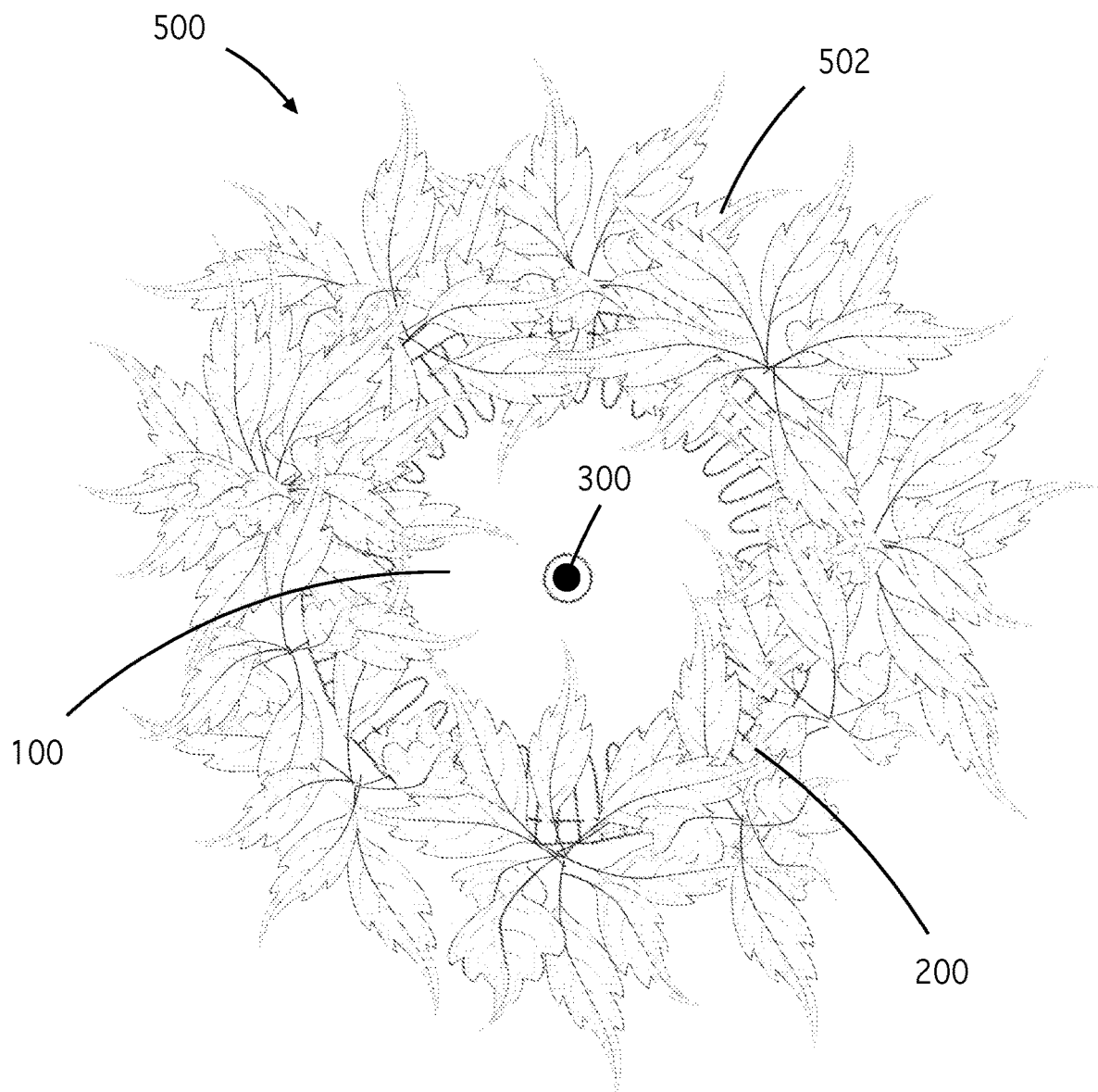
Figure 5E:
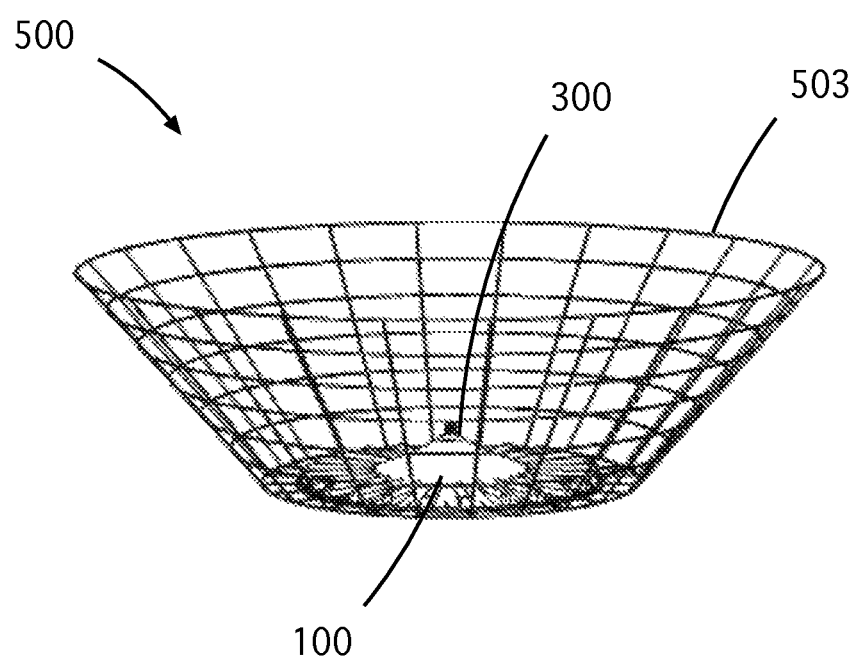
Figure 5F:
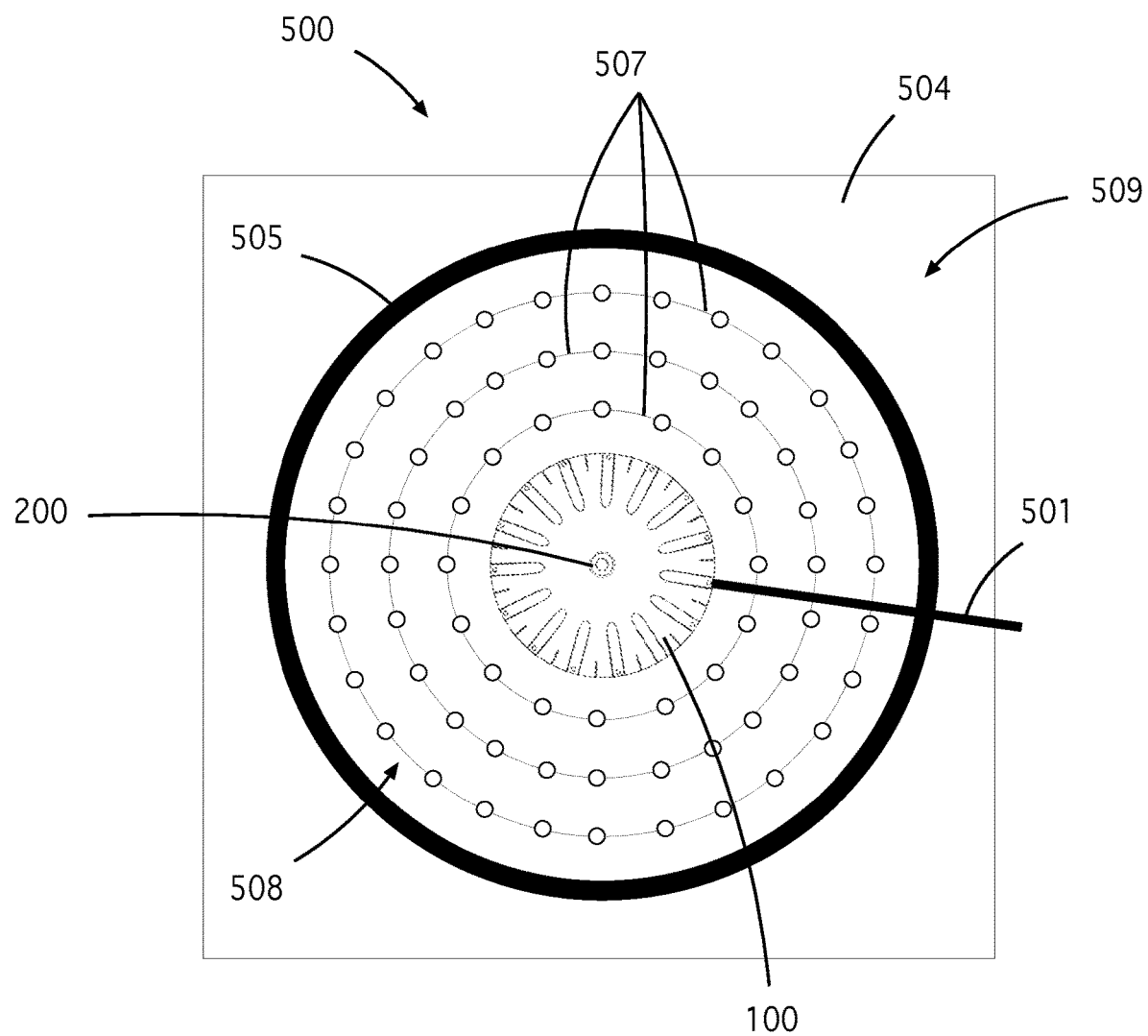

FIGS. 5A, 5B, 5C, 5D, 5E and 5F illustrate various views of irrigation device assemblies 500, wherein FIG. 5A illustrates a detailed side view of an exemplary nozzle portion attached to an exemplary liquid dispersal portion with an exemplary rotating nut portion joined with an exemplary dispersal portion, FIG. 5B illustrates a perspective view of an exemplary base portion joined with an exemplary liquid dispersal portion attached to an exemplary nozzle portion, FIG. 5C illustrates a side-sectioned view of an exemplary base portion joined with an exemplary liquid dispersal portion joined with an exemplary nozzle portion with a hose attached to the liquid dispersal portion lower part, FIG. 5D shows a top view of an exemplary base portion showing plants growing in plants growth zones spaced about the periphery of the device, FIG. 5E shows a detailed side view of a plant support joined with an exemplary base portion, and FIG. 5F shows a detailed top view of exemplary concentric circles with exemplary plant openings within an exemplary flood irrigation trench configured about an exemplary irrigation device; in accordance with an embodiment of the present invention.

FIG. 5F shows a plant growth area 509 with concentric circles 507 of openings 506 for plants cut out of a weed barrier 504. A hose 501 is connected to a liquid dispersal portion 300 attached to the top center of the base portion 100. An earthen mound or dam 505 encompasses the concentric circles forming the outer perimeter of the trench 508.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or mechanical system that those skilled in the art will readily know is suitable in light of the foregoing teachings. Thus, the present invention is not limited to any particular tangible means of implementation.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112 (6) when such corresponding structures are not explicitly disclosed in the foregoing patent specification. Therefore, for any invention element(s)/structure(s) corresponding to functional claim limitation(s), in the below claims interpreted under 35 USC § 112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures, which were incorporate by reference above.

Thus, for any invention element(s)/structure(s) corresponding to functional claim limitation(s), in the below claims, that are interpreted under 35 USC § 112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) and 35 USC § 111 (a) necessarily have a filing and/or publication date prior to that of the instant application, and thus are valid prior documents to incorporated by reference in the instant application.

Having fully described at least one embodiment of the present invention, other equivalent or alternative methods of plant support according to the present invention will be apparent to those skilled in the art. Various aspects of the invention have been described above by way of illustration, and the specific embodiments disclosed are not intended to limit the invention to the particular forms disclosed. The particular implementation of a base portion joining a liquid dispersal portion, which joins a nozzle portion to water plants growing in plant growth zones about the device may vary depending upon the particular context or application. By way of example, and not limitation, an irrigation device comprising a base portion, a liquid dispersal portion and a nozzle portion described in the foregoing were principally directed to the efficient watering and intensive growth of plants; however, similar techniques may instead be applied to hydroponic or aeroponics plant growing systems, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An irrigation device comprising: a base portion and a liquid dispersal portion, the base portion having a top with an aperture therethrough, the aperture for the insertion of an irrigation pipe or hose, the aperture configured for the attachment of the liquid dispersal portion, the aperture comprising three or more sidewalls, a bottom edge configured at a lower perimeter of the base portion, a top edge configured at a flat top perimeter, a sloped or curved surface between the bottom edge and the top edge, the base portion wider at a bottom than the top to provide stability in use, a plurality of channels configured on the sloped or curved surface, the plurality of channels closed at the top and open at the bottom with a cover wall configured at each end, one channel of the plurality of channels configured without the cover wall so a hose and/or pipe may be inserted into an interior of the base portion, the hose and/or pipe having two ends, one of the two ends of the hose and/or pipe configured with a receptacle, the receptacle disposed to attach to the liquid dispersal portion, the other of the two ends configured with a receptacle disposed to connect to an external water supply, a spillway between each of the plurality of channels, a flange configured about the lower perimeter of the base portion bottom edge, the flange substantially planar, one or more openings spaced about the flange, the one or more openings through the flange, a nail or spike inserts through at least one of the one or more openings to secure the base portion to earth and/or soil at ground level, the liquid dispersal portion attached to the base portion at the top to water plants growing about a periphery of the irrigation device in plant growth zones within a plant growth area, a plant support disposed to join with the base portion to support plants.

2. The irrigation device as claimed in claim 1, wherein the liquid dispersal portion waters plants growing around the periphery, an additional one or more spillways direct a flow of liquid and nutrient to the plant growth zones with at least one plant growth zone inline and adjacent with the additional one or more spillways, each of the at least one plant growth zone next to and/or overlapping another wherein the additional one or more spillways govern the flow of liquid and nutrient to the plant growth zones, the flow of liquid governing the size and shape of the plant growth zones, a greater degree of slope of the additional one or more spillways increases liquid flow increasing the size and shape of the plant growth zones, a lesser degree of slope of the additional one or more spillways decreases liquid flow decreasing the size and shape of the plant growth zones.

3. The irrigation device as claimed in claim 1, wherein a plurality of plants are grown in a spiral, one circle or concentric circles about the irrigation device, wherein the plants are spaced a distance from one another about the spiral, one circle or concentric circles.

4. The irrigation device as claimed in claim 1, wherein the base portion joins with a plant container comprising an outer wall, the plant container filled with a growth medium, the outer wall encompasses the base portion, the outer wall vertical or sloped, a top edge of the outer wall connected to the base portion bottom edge, a bottom edge of the outer wall straight, curved or undulated inserted at least partially into a growth medium at an approximate top center of the plant container, a space created to grow plants between the base portion and the plant container outer wall, the space a depressed area created by moving the growth medium from the center of the space up against a circumference of the base portion and a circumference of the plant container outer wall, the depressed space substantially a trench disposed to flood irrigate plants.

5. The irrigation device as claimed in claim 4, wherein the base portion has an inverted bowl shape.

6. The irrigation device as claimed in claim 1, wherein the liquid dispersal portion comprises an upper part and a lower part, the upper part configured to attach to a nozzle, the nozzle configured to disperse liquid in various ways including trickle, drip, spray and bubble, the lower part configured to attach to the irrigation pipe or hose, a flange portion and a first fixed nut portion between the upper part and the lower part, the flange portion encompassing the liquid dispersal portion above the first fixed nut portion, the flange portion having a larger dimension than the first fixed nut portion, the upper part, the lower part, the flange portion and the first fixed nut portion one piece and unitary, the first fixed nut portion configured with three or more sidewalls, the first fixed nut portion configured to insert into the base portion top aperture, at least one first fixed nut portion sidewall adjacent to a top aperture sidewall of corresponding size and shape, the alignment of the at least one first fixed nut portion sidewall next to at least one corresponding top aperture sidewall, the alignment to inhibit rotation of the liquid dispersal portion in use, a first channel configured within an interior of the liquid dispersal portion, the first channel open from top to bottom, the first channel disposed to pass through liquid and nutrient from the irrigation pipe or hose to the nozzle, a rotating nut portion attaches to the liquid dispersal portion lower part, the rotating nut portion comprising a flange portion and a second fixed nut portion, the flange portion and second fixed nut portion one piece and unitary, the flange portion on top of the second fixed nut portion, the flange portion a larger dimension than the second fixed nut portion, the second fixed nut portion configured with three or more sidewalls, a second channel configured within an interior of the rotating nut portion, the second channel open throughout from top to bottom, the second channel configured for insertion of the liquid dispersal portion lower part, the rotating nut portion rotated upward over the liquid dispersal portion lower part to secure the liquid dispersal portion to the base portion, an elbow portion connected to the liquid dispersal portion, the elbow configured at an acute angle of degree, a third channel through the a center of the elbow portion, the third channel for the pass through of liquid, the elbow portion having two ends, one of the two ends configured to attach to the liquid dispersal portion lower part and an other of the two ends configured to attach to a pipe, hose or fitting.

7. The irrigation device as claimed in claim 6, wherein the flange portion has a circular shape.

8. The irrigation device as claimed in claim 1, wherein the liquid dispersal portion comprises a nozzle portion, the nozzle portion comprising an outer casing, a liquid dispersal chamber, an inner casing, a liquid collection chamber and a connecting aperture, the nozzle portion configured to disperse liquid onto, over and across the base portion to plants growing in the plant growth zones, the nozzle portion further configured to alter a directional flow of the liquid, the outer casing is substantially a cover, a sidewall encompasses an outer edge of the cover to form an enclosure, the sidewall is vertical or sloped, the cover enclosing the inner casing and a cover space between, the cover space, the liquid dispersal chamber and a plurality of ridges spaced about an outer surface of the sidewall, the ridges vertical or sloped and extending out beyond the outer surface of the sidewall, the ridges providing a textured surface to at least partially prevent slippage when turned mechanically by tool or manually by hand, the inner casing comprises a spacer, a sloped flange, a liquid collection chamber and a connecting aperture, the spacer being located at a top center of the inner casing and under the cover forming a spacer space between the two, the spacer dimensionally smaller than the inner casing forming a ledge, the ledge sloped or planar, a plurality of openings spaced about the ledge, the plurality of openings through the ledge to the liquid collection chamber contained within the inner casing, the liquid collection chamber configured between the spacer and the connecting aperture, the connecting aperture configured to attach to the liquid dispersal portion, a fitting, or the irrigation pipe or hose, the connecting aperture threaded or not threaded, the sloped flange encompasses a lowermost perimeter edge of the inner casing, the sloped flange sloped down and away from the a wall of the inner casing, the sloped flange disposed to disperse liquid at an angle, the liquid collection chamber disposed to channel liquid through the plurality of openings in the ledge into the liquid dispersal chamber, a casing space between the outer casing and the inner casing, the distance between the outer casing and the inner casing disposed to govern the flow of a liquid, the flow of liquid rises vertically within the liquid collection chamber through the ledge openings into the liquid dispersal chamber, the vertical liquid flow altered horizontally after contact with a top interior of the outer casing, a horizontal liquid flow further altered downward after contact with an interior surface of the sidewall, a downward flow of liquid further altered by the sloped flange, the liquid disposed to cascade over the sloped flange 360 degrees about a circumference of the sloped flange.

9. The irrigation device as claimed in claim 8, wherein the cover of the outer casing has a closed circular shape with a closed planar top and open bottom.

10. The irrigation device as claimed in claim 1, wherein a plurality of plants are grown spaced a distance from one another on top of, inside or outside a circumference of at least one circle configured within the plant growth area, the plant growth area further comprising a plurality of circles to grow plants, one circle inside the other, each circle spaced a distance from another or a plurality of plants grown spaced a distance from one another on top of, inside or outside the curve of a spiral shape configured within the plant growth area.

11. The irrigation device as claimed in claim 10, wherein a watering apparatus comprising a an external water supply receptacle and nozzle-placed-within the plant growth area, the watering apparatus further comprising a soaker or dripper hose, either said soaker hose or said dripper hose laid about the curve of the spiral or circumference of any circle, one end or both ends of either said soaker hose or said dripper hose connected to the watering apparatus.

12. The irrigation device as claimed in claim 1, wherein the plant growth area is covered with an outer casing forming a non-translucent cover, the non-translucent cover disposed to suppress weed growth, the non-translucent cover permeable or non-permeable, the non-translucent cover fabricated from plastics or cloth, the non-translucent cover manufactured a dark color to attract heat from the sun, the non-translucent cover configured with openings corresponding to a location of the plant growth zones, with one or more cut slits spaced about a perimeter edge of the opening, the non-translucent cover manufactured a reflective color to induce flowering and fruit set of plants.

13. The irrigation device as claimed in claim 12, wherein the plant growth area and/or non-translucent cover is covered with a cover material, the cover material disposed to protect the plants from damage caused by insects, birds and small animals, the cover material non-perforated or perforated, the cover material translucent to allow the passage of sunlight and liquid, the cover material further disposed to collect heat from the sun.

14. The irrigation device as claimed in claim 1, wherein the base portion comprises a truncated hollow cone with a flat planar top.

\* \* \* \* \*